(12) United States Patent
Kikuchi et al.

(10) Patent No.: US 7,224,888 B2
(45) Date of Patent: May 29, 2007

(54) DIGITAL RECORDING/REPRODUCING APPARATUS

(75) Inventors: Shinichi Kikuchi, Yokohama (JP); Kazuya Fujita, Kawasaki (JP); Hideo Kataoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1364 days.

(21) Appl. No.: 09/951,773

(22) Filed: Sep. 14, 2001

(65) Prior Publication Data

US 2002/0041754 A1 Apr. 11, 2002

(30) Foreign Application Priority Data

Sep. 29, 2000 (JP) ............................. 2000-300447

(51) Int. Cl.
*H04G 5/91* (2006.01)

(52) U.S. Cl. ......................................... 386/95; 386/125

(58) Field of Classification Search ................. 386/46, 386/52, 95, 125, 126
See application file for complete search history.

(56) References Cited

U.S. PATENT DOCUMENTS

| | | | |
|---|---|---|---|
| 5,107,481 A | 4/1992 | Miki et al. | |
| 5,438,423 A | 8/1995 | Lynch et al. | |
| 5,701,383 A | 12/1997 | Russo et al. | |
| 6,259,441 B1 | 7/2001 | Ahmad et al. | |
| 6,307,697 B1 * | 10/2001 | Chainer et al. | 360/51 |
| 6,477,320 B1 * | 11/2002 | Asada et al. | 386/126 |
| 7,079,753 B2 * | 7/2006 | Ando et al. | 386/95 |

FOREIGN PATENT DOCUMENTS

| | | |
|---|---|---|
| EP | 0789488 A | 8/1997 |
| JP | 06-342580 A | 12/1994 |
| JP | 07-336630 A | 12/1995 |
| JP | 09-214845 A | 8/1997 |
| JP | 10-293655 A | 11/1998 |
| JP | 10-304287 | 11/1998 |
| JP | 10304287 | 11/1998 |
| JP | 11-328867 A | 11/1999 |
| JP | 2000-175150 A | 6/2000 |
| WO | WO 9933265 A | 7/1999 |

OTHER PUBLICATIONS

Japanese Office Action dated Jan. 25, 2005 for Appln. No. 2000-300447.
US 5,825,354, 10/1998, Bhadkamkar et al. (withdrawn)

* cited by examiner

*Primary Examiner*—James J. Groody
*Assistant Examiner*—Christopher Onuaku
(74) *Attorney, Agent, or Firm*—Pillsbury Winthrop Shaw Pittman, LLP

(57) ABSTRACT

The apparatus comprises a first medium, a first recording/reproducing section which can record information on or can reproduce information from the first medium, a second recording/reproducing section which can record information on or can reproduce information from a second medium, and a display signal output section. The apparatus is configured to compose input information, being subjected to recording of the first recording/reproducing processing section, with a reproduction signal, being reproduced by the first recording/reproducing processing section. A result of composition is then output to the display signal output section.

17 Claims, 15 Drawing Sheets

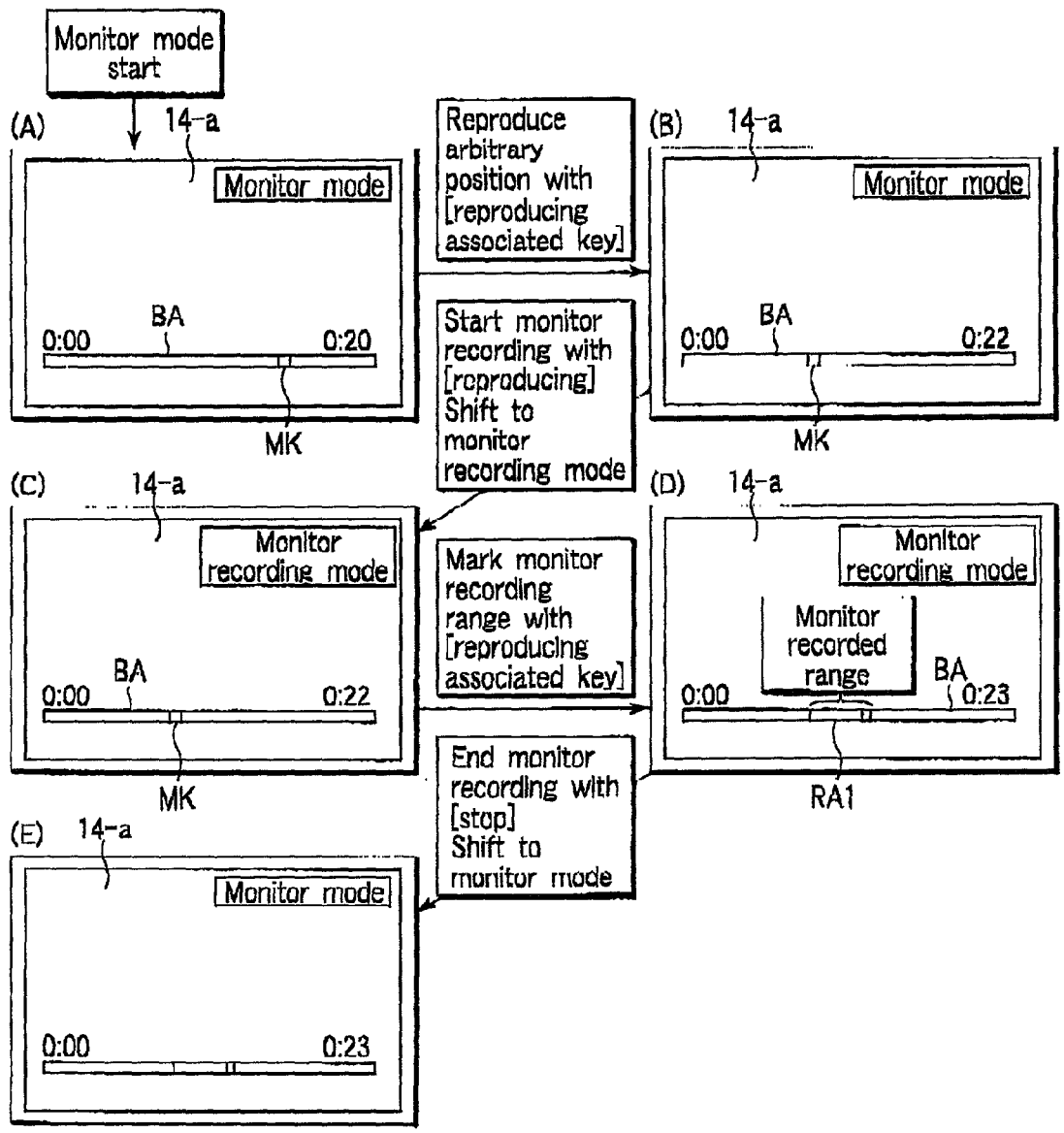
F I G. 15

DIGITAL RECORDING/REPRODUCING APPARATUS

CROSS-REFERENCE TO RELATED APPLICATIONS

This application is based upon and claims the benefit of priority from the prior Japanese Patent Application No. 2000-300447 filed Sep. 29, 2000, the entire contents of which are incorporated herein by reference.

BACKGROUND OF THE INVENTION

1. Field of the Invention

The present invention relates to a recording/reproducing apparatus which can simultaneously operate a plurality of recordable/reproducible mediums such as a hard disk(s), and recordable/reproducible digital versatile disc(s) (DVD).

2. Description of the Related Art

In recent years, optical disc players, for playing back optical discs with image, sound and other recorded data have been developed. These players, for LD or video CD, for example, have been widely utilized for the purpose of viewing movies, singing at Karaoke bars, etc.

At present, a DVD standard has been proposed in which an internationally standardized moving image coding expert group (MPEG2) system is used, and further an AC3 audio compression system is employed.

This DVD standard supports the MPEG2 scheme for a moving picture compression method according to the system layer of MPEG2, and also supports the AC3 audio compression scheme as well as the MPEG audio compression scheme for an audio compression method. Further, in this DVD standard, control data (Navigation pack) is additionally adapted so that a special reproduction such as a fast-forward or reverse reproduction etc. can be performed. Furthermore, in this DVD standard, the standard of ISO9660 and Micro UDF is supported so that the data of a disc can be read by a computer.

Moreover, as an own standard of media, subsequent to the standard of DVD-ROM which is the media of DVD-video, the standard of DVD-RAM (storage capacity of about 4.7 GB) is also completed, and DVD-RAM drives are beginning to spread as computer peripherals.

Additionally, at present, a DVD video standard which utilizes DVD-RAM and realizes a system capable of recording/reproducing information in real time, that is, a real time recording (RTR)-DVD standard is being completed, and a verification operation is also scheduled to end in the near future.

The standard is developed based on the DVD video standard now on the market. Furthermore, a file system corresponding to the RTR-DVD is also standardized.

On the other hand, a system is also considered in which a hard disk drive (HDD) built in the recording/reproducing apparatus is utilized to record/reproduce a broadcast signal. In the hard disk drive, data of 100 Gbytes or more can be recorded.

When the hard disk drive and DVD system are individually considered, both have advantages and disadvantages.

The hard disk drive is built into the recording/reproducing apparatus in a normal use mode, and cannot be removed. Therfore, it is impossible to store data infinitely. The amount of recording space sometime runs short. Moreover, a user cannot easily remove the drive out of the recording/reproducing apparatus. Therefore, it is impossible to take out the disk and reproduce the data recorded on the disk with another apparatus.

On the other hand, a recordable/reproducible DVD has a small storage capacity as compared with a hard disk. Moreover, it is impossible to record copy-protected information.

BRIEF SUMMARY OF THE INVENTION

According to an embodiment of the present invention, there is provided a recording/reproducing apparatus comprising: a first recording/reproducing medium built into the apparatus for use as a temporary storage; a first recording/reproducing section which can record information on or reproduce information from the first recording/reproducing section; a second recording/reproducing section which can record information on or reproduce information from a second recording/reproducing medium; a display signal output section for supplying an external device with a reproduction signal from the first or second recording/reproducing section; and a system control section for controlling an operation of the apparatus.

The apparatus may further comprise a section which composes input information, being subjected to recording processing of the first recording/reproducing section, with a reproduction signal, being reproduced by the first recording/reproducing section, to provide a result of composition, and outputs the composition result to the display signal output section, when a time slip command and monitor command are given to the system control section.

BRIEF DESCRIPTION OF THE SEVERAL VIEWS OF THE DRAWING

FIG. 15 is an explanatory view continued from FIG. 14.

DETAILED DESCRIPTION OF THE INVENTION

An embodiment of the present invention will be described hereinafter with reference to the drawings.

Figure 1:
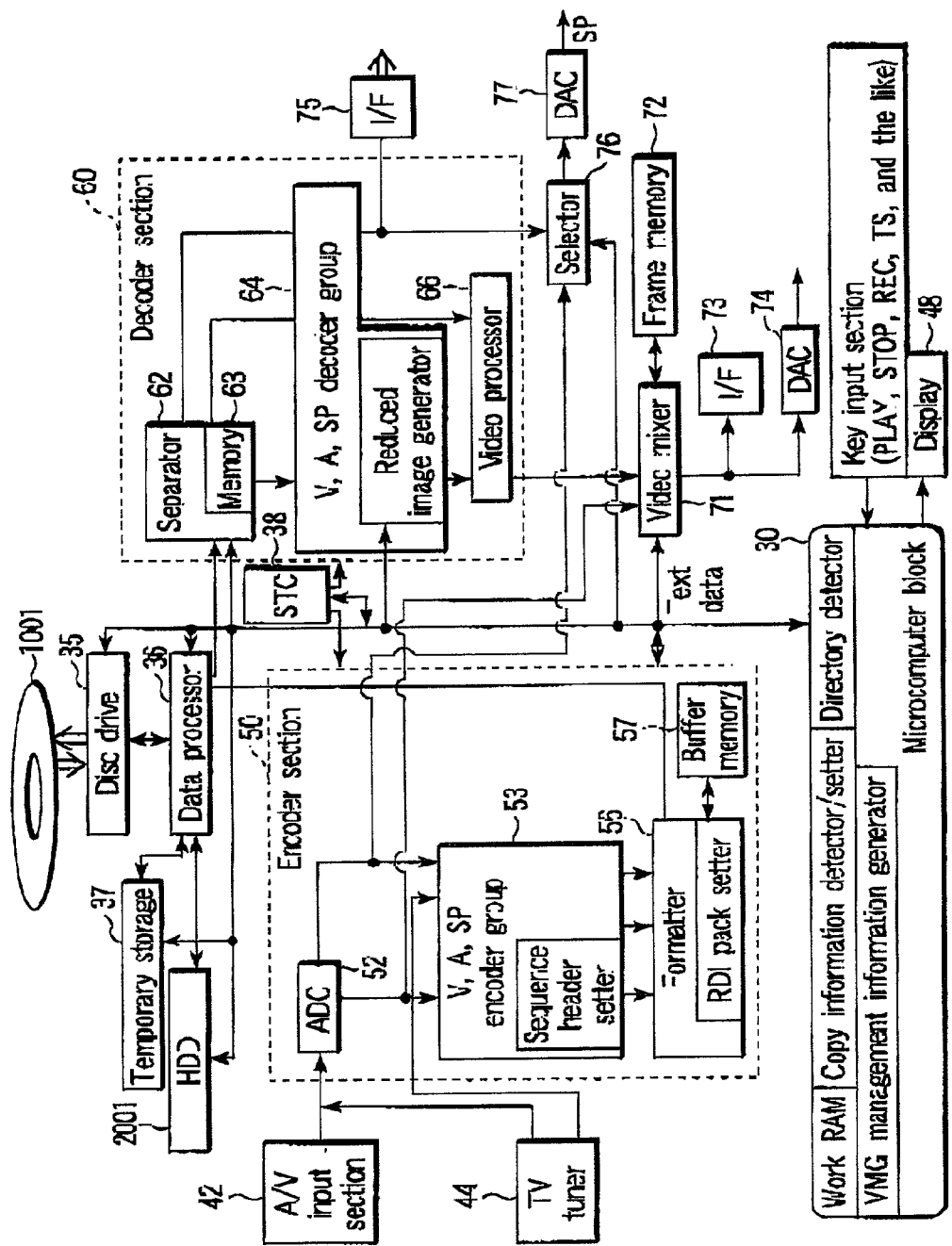
FIG. 1 is a diagram showing a basic constitution of a recording/reproducing apparatus according to an embodiment of the present invention.

FIG. 1 is a diagram showing one embodiment of a recording/reproducing apparatus to which the present invention is applied. The blocks of FIG. 1 can be roughly divided into those of a recording section, shown on the left side, and those of a reproducing section, shown on the right side. The blocks of each section of FIG. 1 will be described later in detail.

Figure 2:
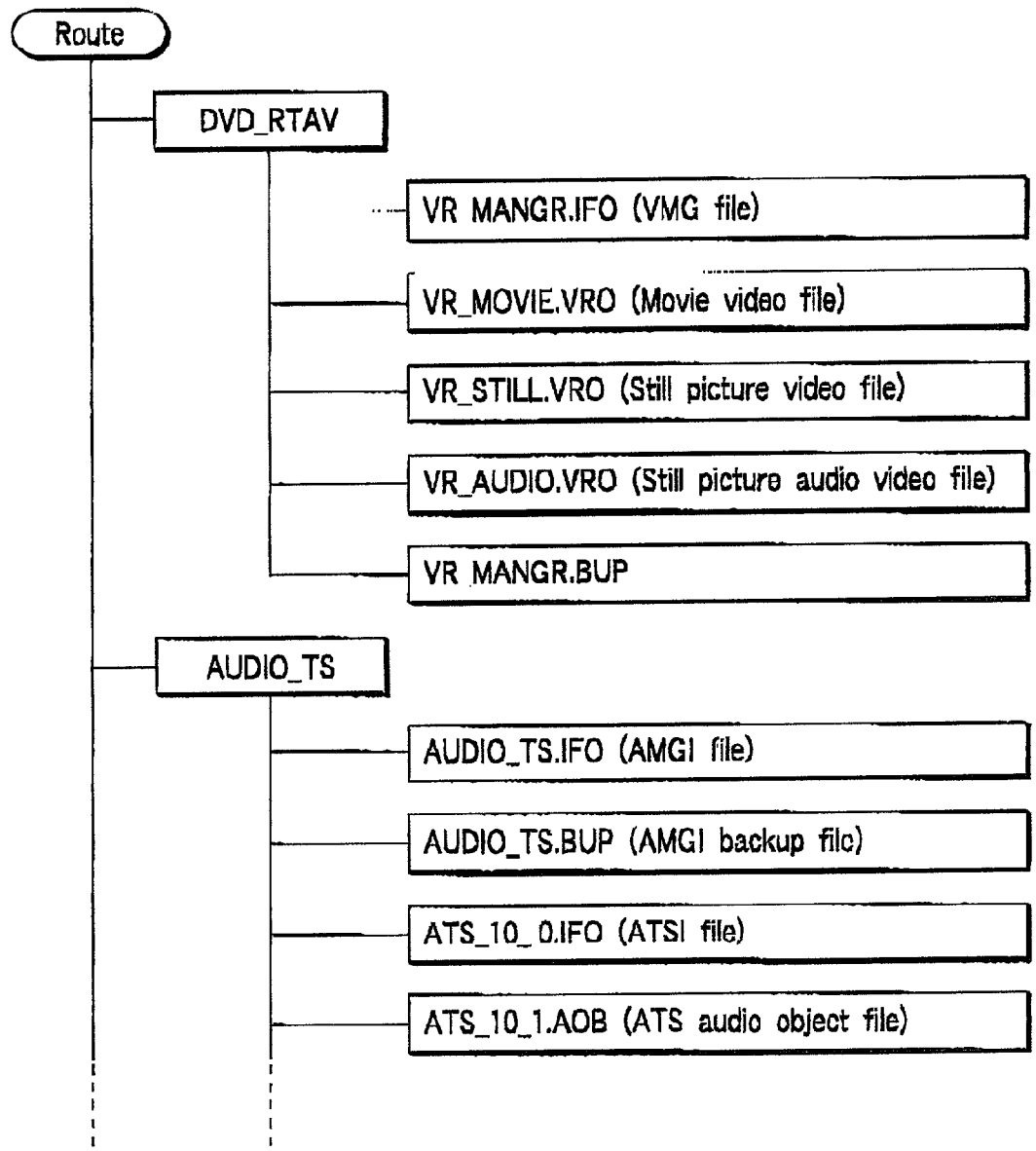
FIG. 2 is a diagram showing an example of a directory structure of a DVD.

FIG. 2 shows a part of a directory structure of a DVD system. Particularly, FIG. 2 shows a directory structure of real time recording (RTR) DVD of the DVD system, and a directory structure of an audio file. In DVD, directories for respective standards exist, and directory names are "VIDEO_TS" in DVD-video, "AUDIO_TS" in DVD audio, and "DVD_RTAV" in RTR-DVD. FIG. 2 shows "DVD_RTAV" and "AUDIO_TS". Recorded data exists in each directory.

Moreover, the data is stored in a normal file form in the DVD. A title corresponds, for example, to one movie, and a plurality of titles can be recorded on one disc. Moreover, a group of titles is called a title set, and the title set is constituted of a plurality of files.

Information for managing the disc information is recorded on one disc in DVD-video. The management information is recorded as a file, and referred to as a video manager (VMG).

Furthermore, the DVD-video title set (VTS) includes video title set information (VTSI) for managing the title set, and is constituted of the VTSI, video file constituted of video data, and a backup of the VTSI.

On the other hand, the information for managing the disc information (VMG) and information for managing the title set (VTSI) are unified in RTR-DVD, and defined as new video manager information (VMGI).

In the directory "DVD-RTAV", respective files, that is, VR_MANGR.IFO as a video manager (VMG) file, VR_MOVIE as a movie video file, VR_STILL.VRO as a still picture video file, VR_AUDIO.VRO as a still picture audio video file, and VR_MANAGR.BUP as a backup of video manager exist.

Moreover, in the directory "AUDIO_TS", AUDIO_TS.IFO as an audio manager information (AMGI) file, AUDIO_TS.BUP as an audio manager information (AMGI) backup file, ATS_01_0.IFO as an audio title set information (ATSI) file, and ATS_01_0.AOB as an audio title set (ATS) audio object file exist.

Navigation data is recorded in the VR_MANEGER.IFO file, and is data for advancing a program set, program, entry point, play list, and the like.

The VR_MOVIE.VRO file is a so-called movie AV file for recording a movie video object (movie VOB).

The VR_STILL.VRO is a still picture AV file for recording a still picture VOB.

Moreover, the VR_AUDIO.VRO is a still picture additional audio file for recording an additional audio stream for a still picture.

The VR_MOVIE.VRO is used to record an original VOB constituted of a video part including an arbitrary sub picture unit. Moreover, in this case, an audio part associated with the video part is also included in the original VOB.

The VR_AUDIO.VRO is a file for use in recording the additional audio part, and the additional audio part indicates an audio stream recorded by after-recording. The audio part recorded in the VR_AUDIO.VRO is used in combination with several video parts recorded in the VR_STILL.VRO.

The VR_MANGR.BUP is a backup file of VR_MANGR.IFO.

FIG. 3A shows a file structure of VR_MOVIE.VRO as the movie video file.

The video file has a hierarchical structure, one file is constituted of a plurality of video objects (VOB), one VOB is constituted of a plurality of video object units (VOBU), and one VOBU is constituted of a plurality of packs. Examples of the plurality of packs include an RDI pack, V pack, A pack, and the like.

The V pack is constituted by compressing video data in an MPEG2 system, and is constituted of a pack header, packet header, and video data section. The A pack is constituted by processing the audio data, for example, by a linear PCM, MPEG, or AC3 system, and is constituted of a pack header, packet header, and audio data section.

FIG. 3B shows data in the V pack and a format of video data based an the MPEG2 system.

A group of pictures (GOP) is a compressed unit using a plurality of video frames, and a sequence header is added to the top of the unit. In the sequence header, a start code (SHC) of the sequence header, number (HS) of longitudinal lines of a pixel, number (VS) of lateral lines of the pixel, aspect ratio (PAR), and the like are described.

Figure 4:
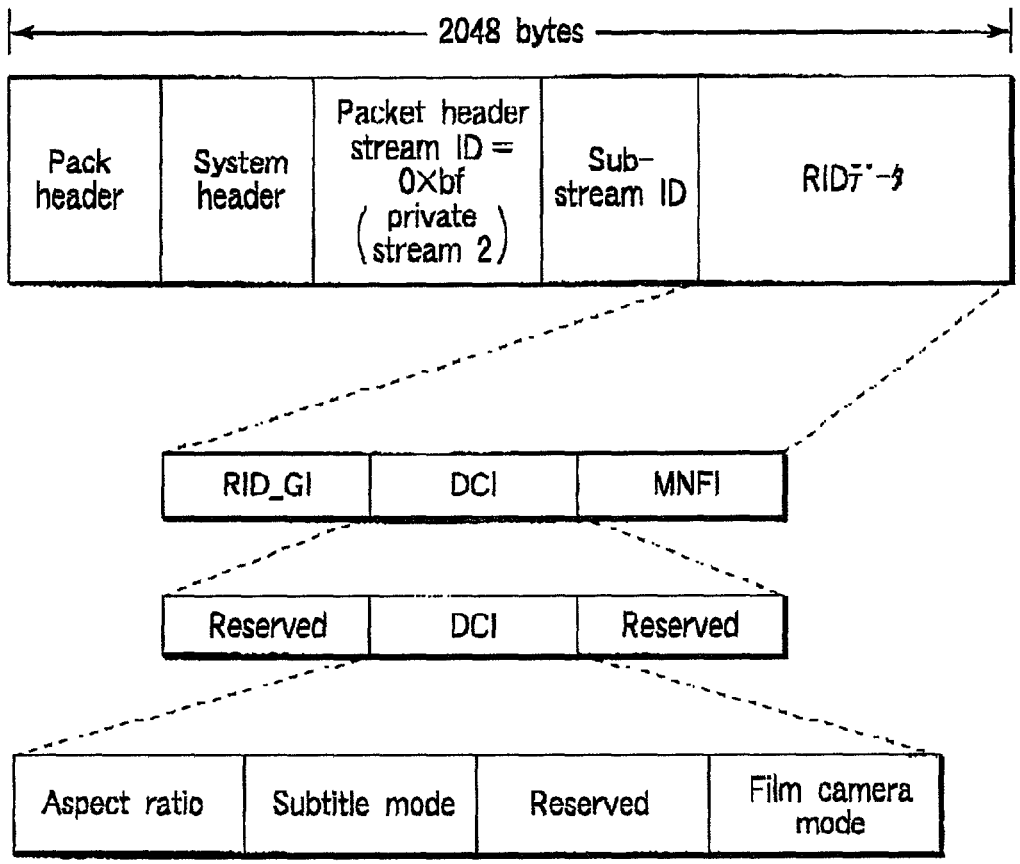
FIG. 4 is an explanatory view of a RDI pack.

An RDI pack shown in FIG. 4 is a real time data information pack (RDI_PCK), and includes real time general information (RDI_GI), display control information (DCI), manufacturer information (MNFI), and the like.

The real time general information (RDI_GI) includes information indicating a start time for reproducing a first field of VOBU to which the information belongs, that is, VOBU_S_PTM, and information indicating a recording time of the VOBU, that is, VOBU_REC_TM.

The display control information (DCI) includes information (DCI_SS) indicating statuses of display control information (DCI), and display control information (DCI) itself.

The display control information status (DCI_SS) in (DCI_SS) is a first area, and a case (01b) in which only effective aspect ratio information exists, and a case (11b) in which an effective aspect ratio, subtitle mode, and film camera mode exist are identified.

The display control information (DCI) includes aspect ratio information, subtitle mode information, and film camera mode.

The aspect ratio information indicates an aspect ratio of 4:3 (000b), and aspect ratio of 16:9 (0001b). Furthermore, when a source picture is a letter box, 1000b (letter box (14:9) disposed in a screen center), 0100b (letter box (14:9) disposed in a screen top), 1101b (letter box (16:9) disposed in the screen center), 0010b (letter box (16:9) disposed in the screen top), 1010b (letter box (>16:9) disposed in the screen center), and 0111b (14:9, full format, disposed in the center) are identified.

In the subtitle mode, a subtitle which does not open (00b), a subtitle which is in an active image area (01b), and a subtitle which is outside the active image area (10b) are identified.

In the film camera mode, a camera mode (0b), and film mode (1b) are identified.

A data reproducing order recorded in the video file is defined by a program chain (PGC). A cell is defined in the program chain (PGC), and VOB as an object to be reproduced is defined in the cell. A portion in which concrete information of PGC is recorded is a program chain information (PGCI) portion of VMG file. There are two types of PGCI, one is original PGCI (ORG_PGCI), and the other is a user defined PGC table (UD_PGCIT).

Turning back to FIG. 1, the recording/reproducing apparatus of the disc standardized as described above will be described.

A reproducing processing in the recording/reproducing apparatus shown in FIG. 1 is performed according to PGCI, a plurality of programs can be designated in PGC, and the cell is defined in the program. Moreover, VOB as the object to be reproduced is designated by the cell. Moreover, a special PGC for reproducing the object in order of recording is referred to as an original PGC, and information of the original PGC is recorded as ORG_PGCI. Furthermore, attribute information of the video data (resolution information, aspect information, sound attribute information, and the like) is recorded in stream information (STI) in VMGI. Additionally, the pack is a minimum unit for performing a data transfer processing. Moreover, a minimum unit for performing a logic processing is a cell unit, and the logic processing is performed by the unit. Therefore, during recording, a recording signal is converted to a form which is compatible with the aforementioned format.

The information recording/reproducing apparatus comprises: a hard disk drive 2001; a disc drive 35 for rotating/driving an optical disc 1001 as an information storage medium which can construct a video file, and reading/writing information with respect to the optical disc 1001; an encoder section 50 constituting a recording side; a decoder section 60 constituting a reproducing side; and a microcomputer block 30 for controlling the whole operation of the apparatus as main constituting elements.

The encoder section 50 comprises: an analog to digital converter (ADC) 52; an encoder group 53 including a video (V) encoder, audio (A) encoder, and sub picture (SP) encoder; a formatter 56 for setting an output of each encoder to a predetermined format; and a buffer memory 57.

To the ADC 52, an external analog video signal+external analog audio signal from an AV input section 42, or an analog video signal+analog sound signal from a television (TV) tuner 44 are inputted.

The ADC 52 digitizes the inputted analog video signal, for example, while a sampling frequency is 13.5 MHz and number of quantizing bits is eight. That is, a luminance component Y, color-difference component Cr (or Y-R) and color-difference component Cb (or Y-B) are quantized with eight bits, respectively.

Similarly, the ADC 52 digitizes the inputted analog audio signal, for example, while the sampling frequency is 48 kHz and the number of quantizing bits is 16.

Additionally, when the digital video signal or the digital audio signal is inputted to the ADC 52, the digital video signal or the digital audio signal is passed through the ADC 52. Moreover, a jitter reduction processing, sampling rate change processing, and the like may also be performed with respect to these digital video and audio signals without changing contents.

The digital video signal outputted from the ADC 52 is sent to the formatter 56 via the V encoder. Moreover, the digital audio signal outputted from the ADC 52 is sent to the formatter 56 via the A encoder.

The V encoder has a function for converting the inputted digital video signal to a compressed digital signal at a variable bit rate based on the MPEG2 or MPEG1 standard. Moreover, the A encoder has a function for converting the inputted digital audio signal to the digital signal compressed at a fixed bit rate or a digital signal of a linear PCM based on the MPEG or AC-3 standard.

When sub picture information is inputted from the AV input section 42 (e.g., signal from DVD video player with an independent output terminal of a sub picture signal), or when a DVD video signal having this data constitution is broadcast and received by the TV tuner 44, the sub picture signal (sub picture pack) in the DVD video signal is inputted to the SP encoder. The sub picture signal inputted to the SP encoder is arranged into a predetermined signal mode, and sent to the formatter 56.

The formatter 56 uses the buffer memory 57 as a work area to perform a predetermined signal processing with respect to the inputted video signal, audio signal, sub picture signal, and the like. Thereby, the recorded data which is compatible with the format (file structure) described above with reference to FIGS. 3 and 4 is outputted to a data processor 36.

Here, the present apparatus can supply the information encoded by the encoder section 50, and prepared management information to the hard disk drive 2001 via the data processor 36, and record the information on a hard disk. Moreover, the information recorded on the hard disk can also be recorded on the optical disc 1001 via the data processor 36 and disc drive 35. Furthermore, the information encoded by the encoder section 50, and prepared management information can be recorded on the optical disc 1001 via the data processor 36 and disc drive 35.

Moreover, in the present invention, when the information recorded on the hard disk of the hard disk apparatus 2001 has the same data format as that of the optical disc 1001, the information of the hard disk can be recorded on the optical disc without any encode processing.

Furthermore, when the data format of the information recorded on the hard disk of the hard disk drive 2001 is different from that of the optical disc 1001, the encoder section 50 encodes the information read from the hard disk. Subsequently, the encoded information can be recorded on the optical disc 1001.

Here, a standard encode processing for preparing the data to be recorded into the optical disc 1001 will briefly be described. That is, when the encode processing starts in the encoder section 50, parameters necessary for subjecting video (main picture) data and audio data to the encode processing are set.

Subsequently, when the set parameter is used to subject the main picture data to a pre-encode processing, distribution of a code amount optimum for a set average transfer rate (recording rate) is calculated. The encode processing of the main picture data is executed based on the code amount distribution obtained by the pre-encode processing. In this case, the encode processing of the audio data is also executed. Similarly, a parameter necessary for subjecting the sub picture data to the encode processing is set, and the sub picture data subjected to the encode processing is prepared.

The encode processed main picture data, audio data and sub picture data are combined, and converted to a structure of video object set VOBS.

Figure 5:
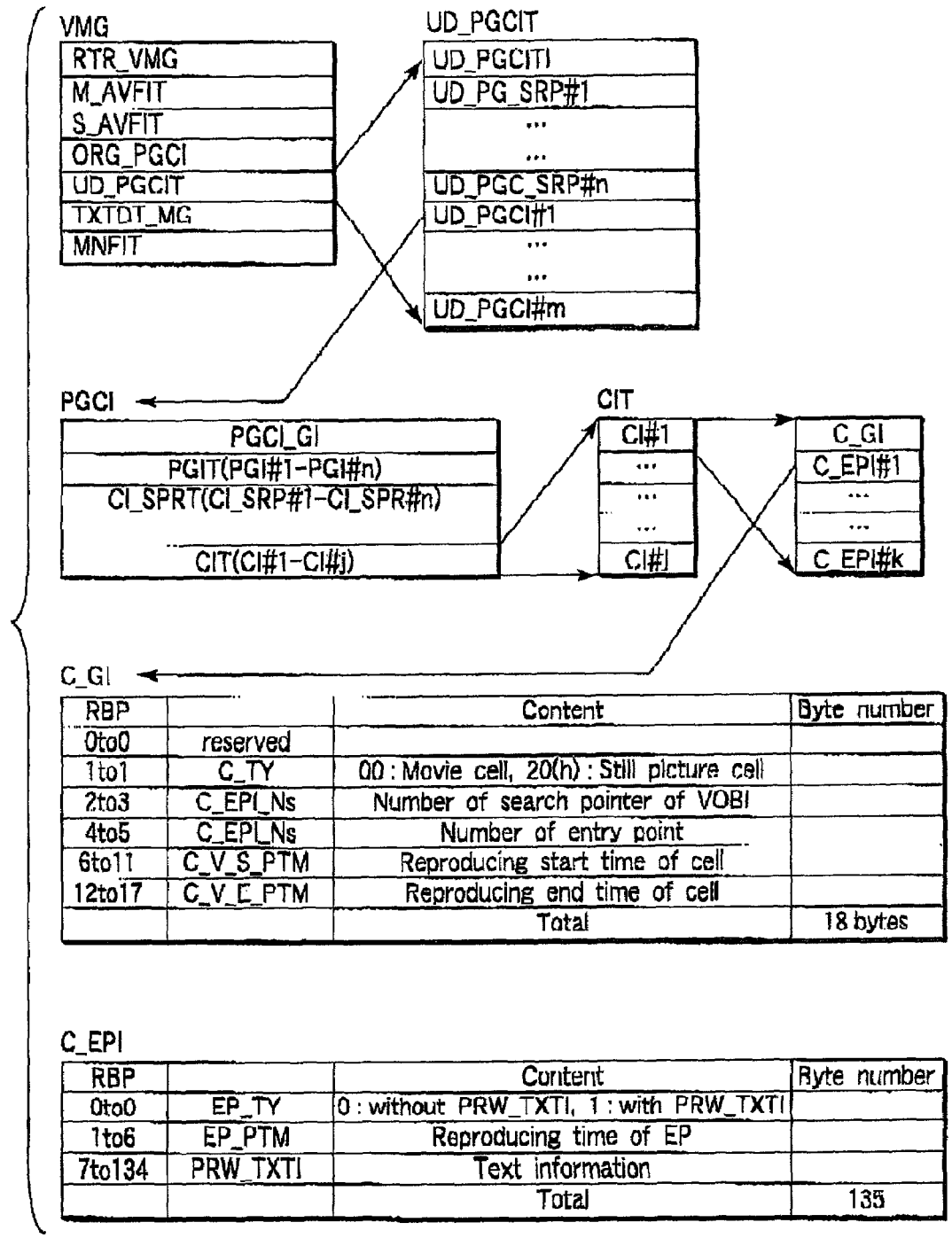
FIG. 5 is an explanatory view showing a hierarchical structure of VMG in the DVD standard, particularly a hierarchical structure of a program chain.
Figure 6:
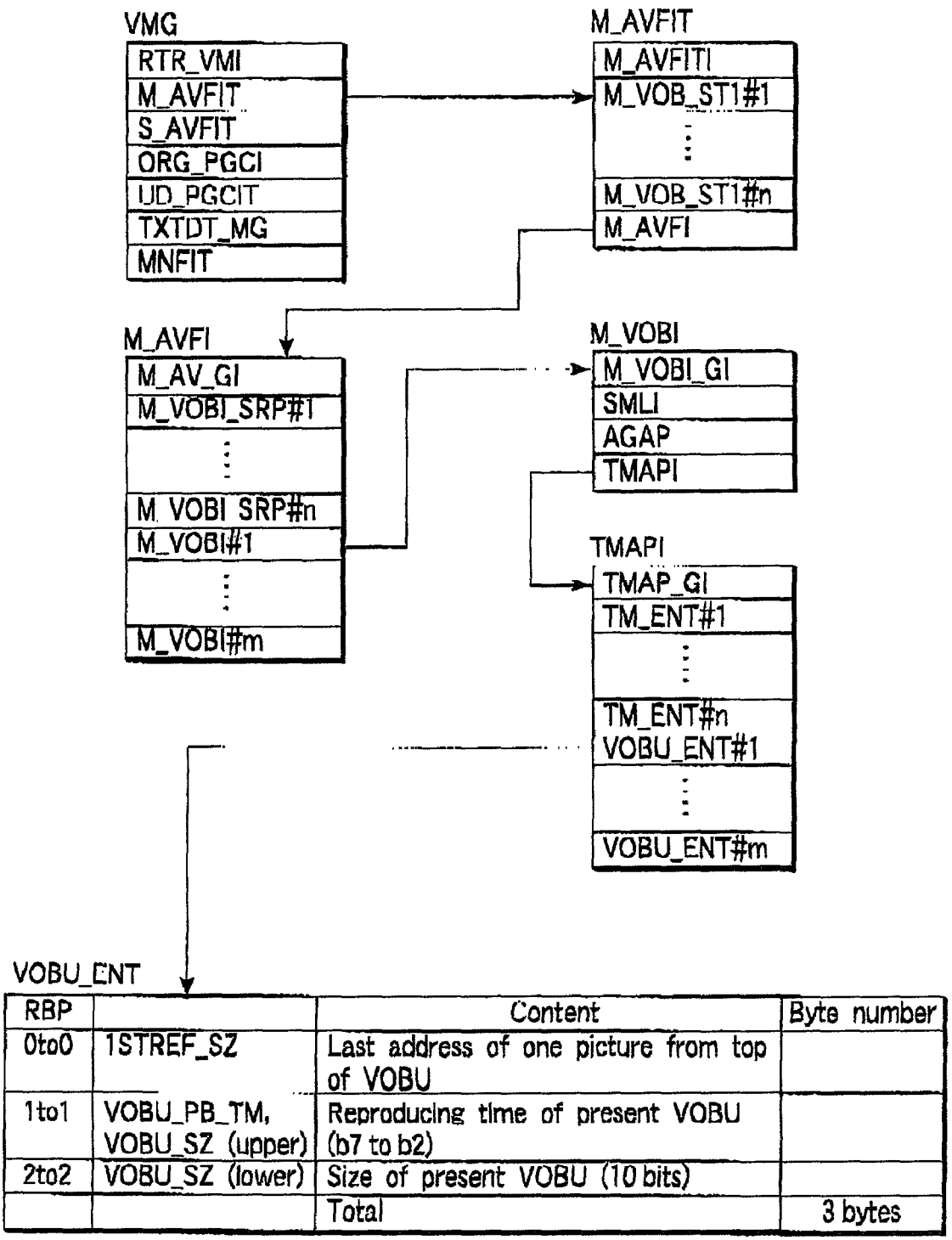
FIG. 6 is an explanatory view showing the hierarchical structure of VMG in the DVD standard, particularly a hierarchical structure of an AV file information table.

That is, the cell is set as the minimum unit of the main picture data (video data), and cell information is prepared as shown in FIG. 5. Subsequently, the constitution of the cell constituting the program chain PGC, and main picture, sub picture and audio attributes are set (information obtained during encoding of the respective data is utilized as a part of these attribute information), and here a VMG file including various information is prepared.

Figure 3:
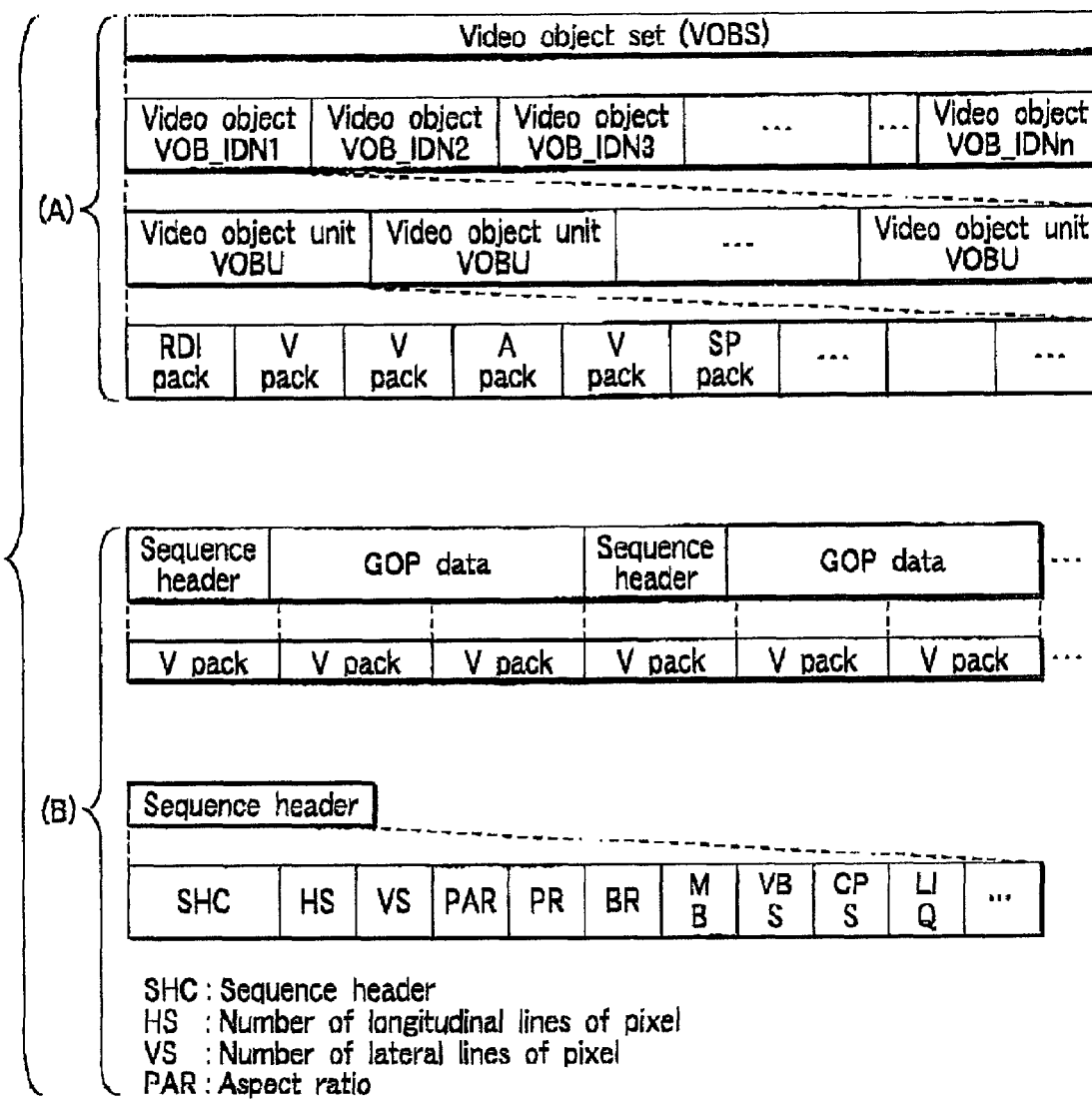
FIG. 3 is an explanatory view showing a video object set (VOBS) in a DVD standard, hierarchy of a data structure in an MPEG standard, and content of the hierarchy.

The encode-processed main picture data, audio data and sub picture data are finely divided into constant-size (2048 bytes) packs (FIG. 3). A dummy pack is appropriately inserted into these packs. Additionally, time stamps such as a presentation time stamp (PTS) indicating a reproducing time, and a decoding time stamp (DTS) indicating a decoding time are described in the pack other than the dummy pack. For PTS of the sub picture, the main picture data of the same reproducing time zone, or an arbitrarily delayed time from PTS of the audio data can be described.

Moreover, RDI pack (corresponding to a navigation pack) is disposed on top of the unit of the video object unit VOBU and the respective cells are disposed so that the respective data can be reproduced in order of a time code. This constitutes the video object VOB of a plurality of cells. A video object set VOBS constituted of one or more video objects VOB is recorded in the movie video file.

Additionally, when a DVD reproducing signal is digitally copied from a DVD video player, the contents of the cell, program chain, management table, time stamp, and the like are predetermined, and it is therefore unnecessary to prepare these.

A section for executing reading/writing (recording and/or reproducing) of the information with respect to the optical disc 1001 comprises the disc drive 35 having optical and driving systems, the data processor 36, a temporary storage 37, and a system time counter or a system time clock (STC) 38.

The temporary storage 37 is utilized to buffer a constant amount of data written into the optical disc 1001 via the data processor 36 and disc drive 35 (data outputted from the encoder section 50), or buffer a constant amount of data reproduced from the optical disc 1001 via the disc drive 35 and data processor 36 (data inputted to the decoder section 60). The disc drive 35 includes a rotation control system, laser driving system, optical system, and the like for the optical disc.

For example, when the temporary storage 37 is constituted of a 4 Mbyte semiconductor memory (DRAM), it is possible to buffer the recorded or reproduced data for about eight seconds at a recording rate of 4 Mbits per second (Mbps) on average. Moreover, when the temporary storage 37 is constituted of a 16 Mbyte electrically erasable and programmable (EEP) flash memory (ROM), it is possible to buffer the recorded or reproduced data for about 30 seconds at a recording rate of 4 Mbps on average.

Furthermore, when the temporary storage 37 is constituted of a 100 Mbyte micro hard disk drive (HDD), it is possible to buffer the recorded or reproduced data for three minutes or more at the recording rate of 4 Mbps on average.

The temporary storage 37 can also be utilized to temporarily store the recorded information for a short time until replacement of the optical disc 1001 with a now disc, when the optical disc 1001 is used up during recording.

However, in the apparatus according to an embodiment of the present invention, since the hard disk drive 2001 having a large capacity is disposed, this drive can be utilized.

Moreover, the temporary storage 37 can also be utilized to temporarily store the data excessively read from a usual drive in a constant time, when a high-speed drive (double or more speed) is employed as the disc drive 35. When the data read during reproducing is buffered in the temporary storage 37, and even when an optical head (not shown) causes a reading error by vibration shock, the reproduced data buffered in the temporary storage 37 is changed/used, and the reproduced picture can be prevented from being interrupted.

The data processor 36 follows control of the microcomputer block 30 to supply DVD recorded data outputted from the encoder section 50 to the disc drive 35, extract DVD reproduced signal reproduced from the optical disc 1001 from the disc drive 35, rewrite the management information recorded on the optical disc 1001, or to delete the data (file or video object) recorded on the optical disc 1001.

The microcomputer block 30 includes a microprocessing unit (MPU) or a central processing unit (CPU), ROM with control program written therein, and RAM for providing a work area necessary for executing the program.

The MPU of the microcomputer block 30 follows the control program stored in the ROM and uses the RAM as the work area to execute detection of a defective place, detection of an unrecorded area, setting of video recorded information recording position, UDF recording, and setting of an AV address.

Moreover, the microcomputer block 30 has an information processing section necessary for controlling the whole system, and includes a copy information detector/setter, directory detector, and VMG management information generator.

For an execution result of the MPU, a content to be notified to a user of the disc drive 35 is displayed in a display 48 or the DVD video recorder, or on-screen displayed (OSD) an a monitor display.

Additionally, timings of the microcomputer block 30 for controlling the disc drive 35, data processor 36, encoder section 50 and/or decoder section 60, and the like can be determined based on time data from the STC 38. A recording or reproducing operation is usually executed in synchronization with a time clock from the STC 38, but other processings may be executed at a timing independent of the STC 38.

The decoder section 60 comprises: a separator 62 for separating and extracting each pack from picture information having the pack structure shown in FIG. 3; a memory 63 for use in separating the pack or executing other signal processing; a decoder group 64 including a V decoder for decoding main picture data (content of the video pack) separated by the separator 62, SP decoder for decoding sub picture data (content of the sub picture pack) separated by the separator 62, and A decoder for decoding audio data (content of the audio pack) separated by the separator 62; and a video processor 66 for appropriately combining the main picture data obtained from the V decoder with the sub picture data obtained from the SP decoder, and superposing and outputting sub pictures such as menu, highlight button, and subtitle on the main picture.

An output of the video processor 66 is inputted to a video mixer 71. In the video mixer 71, text data is synthesized. Moreover, the video mixer 71 is also connected to a line for directly extracting the signal from the TV tuber 44 and A/V input section 42. The video mixer 71 is connected to a frame memory 72 for use as a buffer. When the video mixer 71 emits a digital output, the output is transmitted to the outside via an interface (I/F) 73. An analog output of the mixer is outputted to the outside via a DAC 74.

When the A decoder emits the digital output, the output is transmitted to the outside via an interface (I/F) 75. An analog output of the decoder is analog-converted by a DAC 77 via a selector 76 and outputted to the outside. The selector 76 can also select the output from the ADC 52, when the signal from the TV tuber 44 or the A/V input section 42 is directly monitored in response to a select signal from the microcomputer block 30. An analog audio signal is supplied to a not-shown external component (multi-channel (two to six channels) stereo apparatus).

A flow of a video signal in the aforementioned apparatus will briefly be described hereinafter.

First, an inputted AV signal is digital-converted by the ADC 52. The video signal is inputted to the V encoder, the audio signal is inputted to the A encoder, and character data such as character broadcasting is inputted to the SP encoder. The video signal is subjected to MPEG compression, the audio signal is subjected to AC3 or MPEG audio compression, and the character data is subjected to run length compression.

The compressed data from each encoder is packeted to indicate 2048 bytes in a packed state, and inputted to the formatter 56. In the formatter 56, each packet is packed, further multiplexed, and sent to the data processor 36.

Here, the formatter 56 prepares RDI pack based on the information from an aspect information detector 43, and disposes the pack on the top of the video object unit (VOBU).

The data processor 36 forms ECC block for every 16 packs, attaches error correction data, and records the output into the optical disc 1001 via the disc drive 35.

Here, with the disc drive 35 in a busy state for seeking or track jump, the output is stored in the temporary storage 37 (e.g., HDD buffer section), until DVD-RAM drive section (disc drive 35) is prepared.

Furthermore, during recording, the formatter 56 prepares each segmenting information, and periodically sends the information to the MPU of the microcomputer block 30 (information of a time for GOP top interruption).

Examples of the segmenting information include the number of packs of VOBU, end address of one picture from the top of VOBU, reproducing time of VOBU, and the like.

Additionally, the information from the aspect information detector 43 is sent to the MPU at the start of recording, and the MPU prepares VOB stream information (STI). Here, for the STI, resolution data, aspect data, and the like are stored, and each decoder performs initial setting based on the information during reproducing.

Moreover, for the video file, one file is stored in one video in video reproducing DVD.

Here, in a real time video reproducing machine using DVD, it should be noted that a contiguous sector is necessary at minimum for accessing the data in order to reproduce the data without being interrupted during accessing (seeking). This unit is called a contiguous data area (CDA).

The CDA preferably has an ECC block unit. Therefore, a CDA size is a multiple of 16 sectors, and the data is recorded by the CDA unit in the file system. Additionally, in this case, when there is no vacant area fit for the size of CDA in the disc, a short sector used by another file is permitted to enter the CDA. Thereby, it is possible to record the data by the CDA unit.

The apparatus according to an embodiment of the present invention has a time slip (TS) function.

Therefore, the hard disk drive 2001 is effectively utilized. That is, the hard disk drive 2001 records the information on air from the A/V input section or the TV tuner into the hard disk. While this recording is continued, the recorded information may be read, decoded and monitored. Alternatively, it is possible to record the information read from the hard disk in the optical disc 1001. Moreover, while the recorded information is decoded and monitored, it is possible to record the information being monitored in the hard disk.

The hard disk drive 2001 is built into the apparatus, and the optical disc 1001 is removable and can freely be changed by the user.

Here, the recording and reproducing functions of the whole apparatus according to an embodiment of the present invention will be described.

Figure 8:
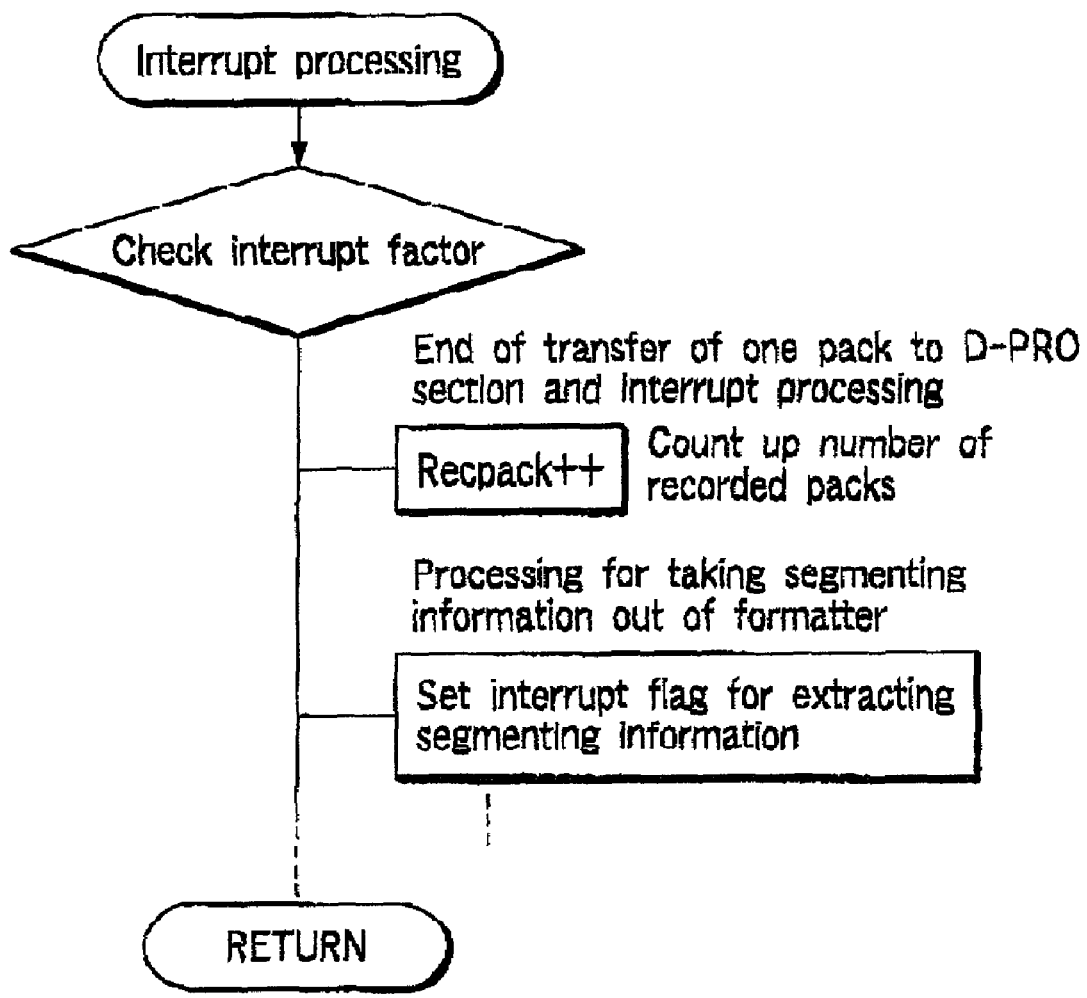
FIG. 8 shows a part of a flowchart.

FIG. 8 mainly shows a function of recording data in the hard disk during a time slip operation.

Here, with respect to the meaning of the time slip operation, there are:

the time slip operation is activated, for example, by a timer recording reservation function, or by a time slip reproducing operation, so that an external input signal is encoded and recorded on the whole hard disk or on the preset buffer area, to thereby achieve rewinding and playing back of the on-air program having been recorded; and the time slip operation is activated to achieve a playback or the recorded data during the recording operation.

(a) The file system of the optical disc (DVD-RAM) is checked. If there is no file system, the file system is constructed.

(b) The directory of the DVD-RAM is checked. If there is no real time recording (RTR) directory, the directory is prepared.

(c) The video manager information (VMGI) is road into the work RAM from the DVD-RAM. If there is no information, the information is generated inside, and a VMGI table is constructed (this step is not shown).

The processing (a), (b), (c) is a so-called preprocessing performed mainly by the microcomputer block 30.

In the processing, while the DVD-RAM is inserted in the recording/reproducing apparatus, the file system, or the vacant area is checked. When the file system already exists, the data is read (steps A1, A2). Additionally, here, it is assumed that the hard disk is initialized. Subsequently, the VMG is prepared, and a writing processing is performed in a management area (step A3).

(d) A recording initial setting is performed with respect to the encoder section 50, and recording is started/set (step A4).

That is, the microcomputer block 30 confirms a state in which recording is possible, and then performs recording initial setting. Furthermore, to reset the STC, set a writing start address to each drive, set a writing command, initially set the formatter, and set an align processing, division (segmenting information) of the cell, VOB, VOBU, program (PG), and program chain (PGC) is prepared/set.

(e) Furthermore, at the start of recording, a recording command is set to the encoder section 50, and the segmenting information in the formatter 56 is registered as VOB, VOBU (step A5). Thereby, when the recording starts, the frame of the input video signal is compressed by a GOP unit, the GOP is packed, and the packs are collected into a VOBU unit in the encoder section 50. Furthermore, aspect ratio information is inserted in the sequence header of GOP (see FIG. 3B). Moreover, the RDI pack is disposed as the top pack of VOBU (see FIGS. 3B and 4). In this case, as shown in FIG. 3A, the audio pack, sub picture pack, and the like are collected. The segmenting information indicates each group of the aforementioned data.

(f) When one CDA of encoded data is accumulated, the data is set to each drive section and recorded in the vacant area of the hard disk drive 2001, and link information of the sector to be recorded is stored in the work RAM (A6).

(g) When the segmenting information is accumulated in the formatter 56, the segmenting information is read and taken as the VOB and VOBU management information in the work RAM, and steps (e) to (g) are repeated until issuance of a time slip end command (steps A7, A8, A9, A10, A11).

That is, when one CDA (recording unit) of data is collected, the microcomputer block 30 determines writing address and length of the data for use in the hard disk drive 2001, and issues a writing command via the data processor 36.

Moreover, the microcomputer block 30 checks whether or not there is an interrupt for extracting the segmenting information. Subsequently, if there is an interrupt, the segmenting information is taken from the formatter 56 (steps A8, A9). It is next checked whether or not there is input information of a time slip end key. With no information, it is checked whether or not the recorded data for one CDA as the next recording unit is accumulated in the formatter 56 (returning to step A6 from step A12).

Here, the encoder section 50 receives the aspect information from the AV input section 42, and sets the information (by the V encoder) in the sequence header (see FIG. 3B) of the MPEG video data according to an aspect information code. Furthermore, the same information is also set to the RDI pack in the formatter.

With operation of a time slip mode cancel key (step A12), it is judged whether or not a recorded video storage mode is set (step A13). When the recorded video storage mode is not set, the recorded data of the hard disk is deleted, and recorded data address information is deleted from the work RAM. Moreover, the segmenting information is also deleted from the work RAM, and the processing ends (steps A14, A15). The recorded data address information is information prepared in the step A11.

When the recorded video storage mode is confirmed in the step A13, the processing shifts to a recorded data storage processing of step A16. An operation flow of recording/storing processing is shown in detail in FIG. 9.

Prior to description of the operation flow of FIG. 9, a processing for an interrupt in the step A8 of FIG. 7 will briefly be described with reference to FIG. 8.

When interrupt information is detected, a factor for the interrupt in checked, the data for one pack is transferred to the data processor 36, and the number of recorded packs starts to be counted up. Moreover, every time one piece of segmenting information is taken for the pack successively processed by the formatter 56, an interrupt flag is set. This processing is performed until the interrupt is canceled. When the interrupt is canceled, the processing shifts to the step A9. It is then judged from the number of recorded packs whether or not there is data for one CDA. Moreover, the interrupt flag is simultaneously deleted. Therefore, even when the interrupt processing is executed, the segmenting information for preparing the cell, VOBU, PG, PGC, and the like is not lost.

Figure 7:
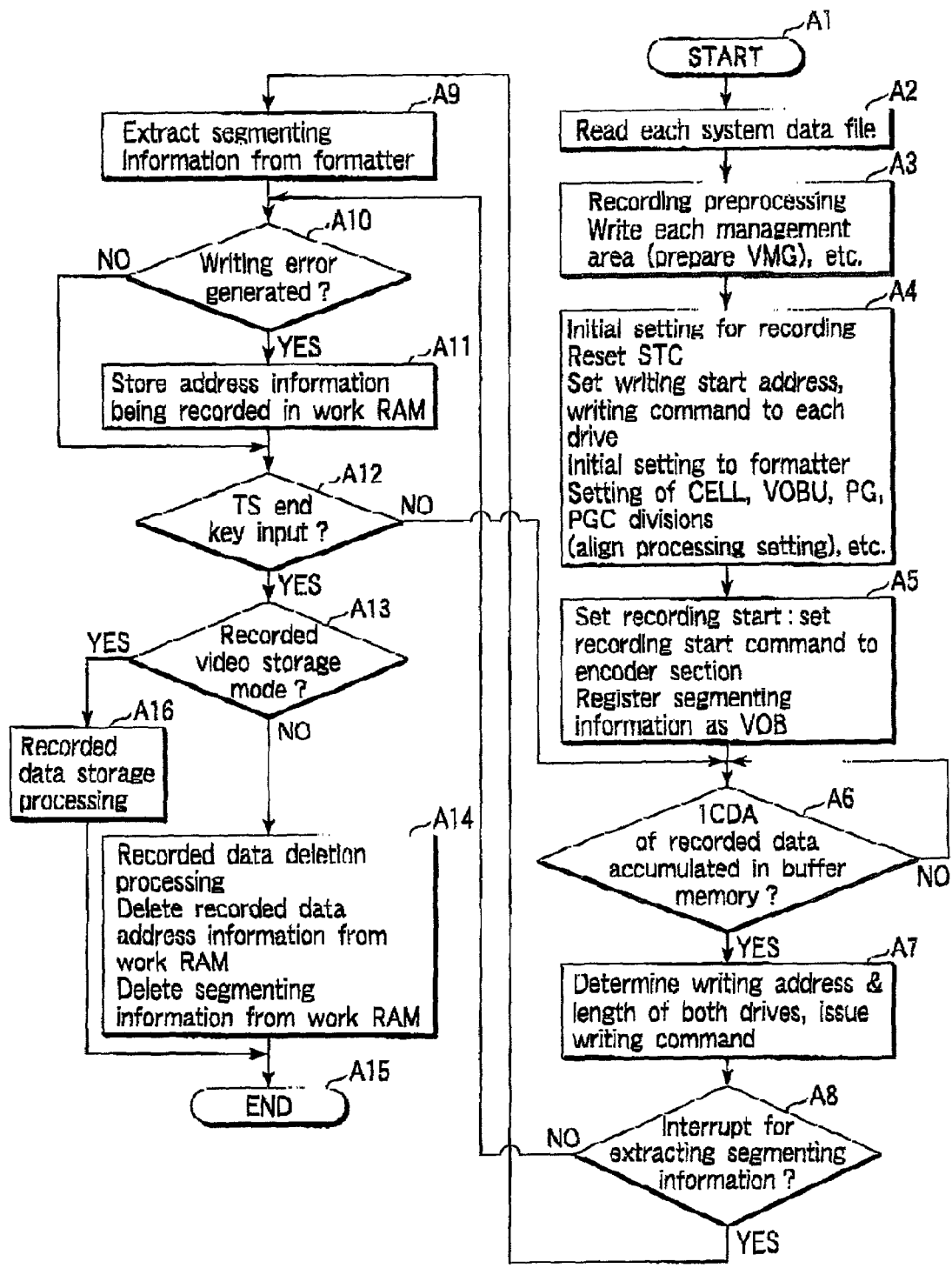
FIG. 7 is a flowchart showing a recording operation of the apparatus according to the present invention.
Figure 9:
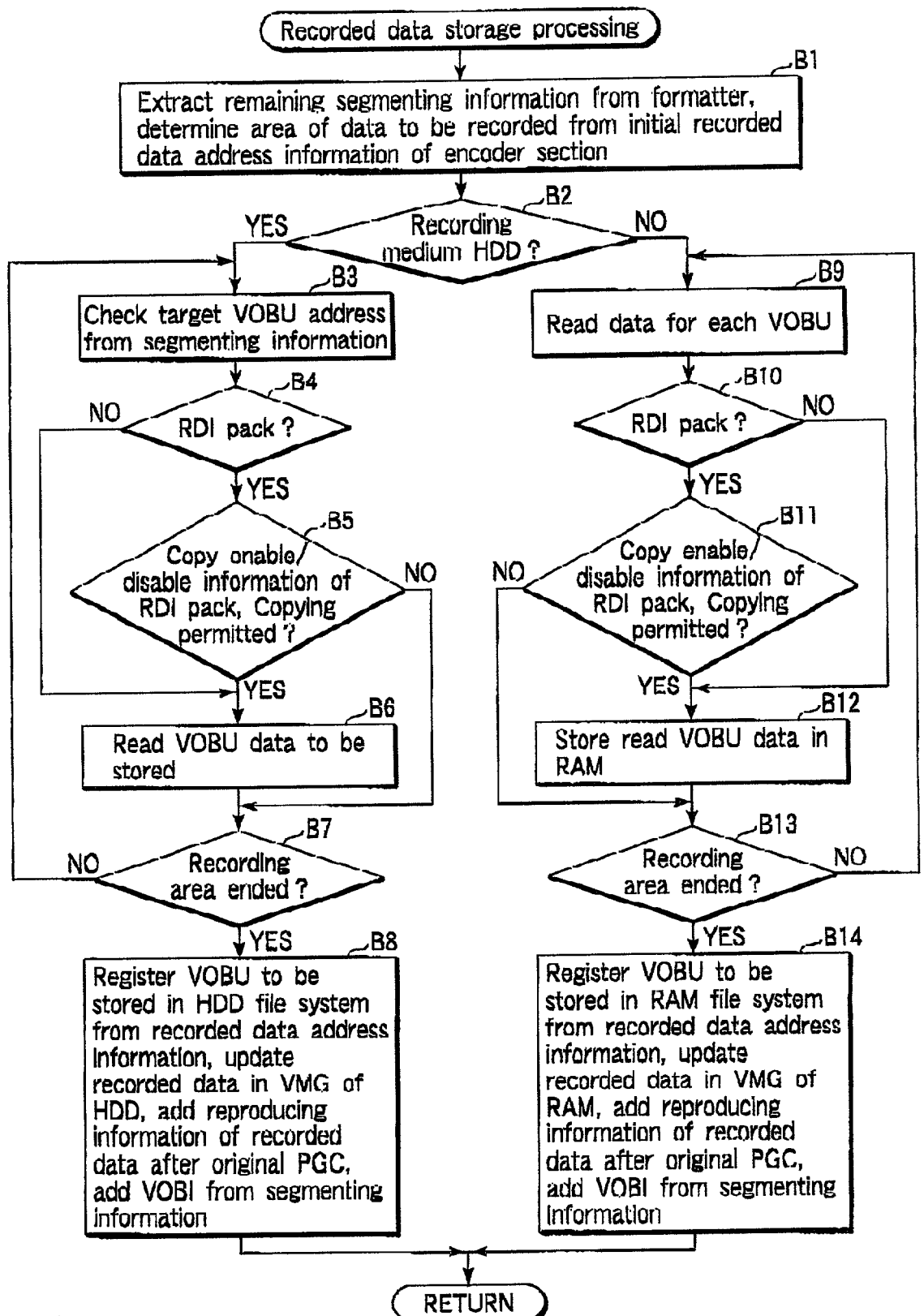
FIG. 9 is a flowchart showing a recorded data storage operation of the apparatus according to the present invention.

FIG. 9 shows a content of the step A16 of FIG. 7 in detail.

A recorded data storage flow is indicated as a flow operated after the time slip end key is pressed.

In the recorded data storage flow, the microcomputer block 30 takes the segmenting information from the formatter 56, and initializes the encoder section. Moreover, the area of the data to be stored (or transferred) is determined from the recorded data address information (step B1).

The area of the data to be stored (or transferred) is determined by the information selected by the user who views a reproducing screen as described later. Alternatively, the area may be determined by an automatic storing (or transferring) function of automatically storing (or transferring) all data subjected to time slip recording.

A processing method for the data to be stored (or transferred) differs with recording media such as DVD-RAM, and hard disk. Therefore, it is judged whether the recording medium is designated as DVD-RAM or hard disk (step B2).

When the recording medium is designated as the hard disk, an address of VOBU as an object to be recorded (stored) is checked from the segmenting information (step B3). It is then checked whether there is an RDI pack (step B4). With presence of the RDI pack, information indicating whether the RDI pack can be copied is checked. It is therefore judged whether or not the pack can be copied (step B5). When there is no RDI pack, and copying is permitted, the VOBU data having the address read based on the address of the VOBU is stored (step B6).

Subsequently, it is checked whether the area of the data to be recorded (stored) ends (step B7). When the area of the data to be recorded (stored) does not end, the processing returns to the step B3 to check the address of the VOBU as the next object from the segmenting information. The steps B4 to B7 are repeatedly executed.

When the data area to be recorded (stored) ends (yes at step B7), an operation of registering the VOBU's to be stored in the file system in the hard disk is performed according to the recorded data address information (step B8). That is, the management information of the image data of VMG of the hard disk is updated, so that the VOBU to be stored can be managed by the management information. Furthermore, image data reproducing information (cell, and the like) is further added after original PGC. Additionally, the segmenting information is utilized to add video object information (VOBI) such as search pointer.

Therefore, when the user designates the area of the data to be recorded (stored) from the video data recorded on the hard disk by the time slip in the recording mode, a storage object is determined, and real recording is performed.

In the aforementioned description, in order to store the recorded data, the management data for the recorded data is updated, prepared, and added, and a real recording state is obtained in which the recorded VOB data is stored as it is.

However, the invention is not limited to the aforementioned embodiment, and the following function may be further provided. That is, an area for recording data to be temporarily recorded on the hard disk (or a buffer area for the time slip) is provided. When the recorded data in the buffer area is to be stored as described above, the portion of the buffer area used to store this recorded data is removed from the designation as the buffer area for time slip, so that this recorded data becomes archives. In this case, a supplementary buffer area is added to compensate for the decrease in the buffer area for time slip.

Alternatively, the following system may be used.

That is, the area of the recorded data to be temporarily recorded on the hard disk (buffer area for time slip) is secured. Moreover, when the recorded image data is stored in the buffer area as described above, the image data to be stored may be copied in a position different from the buffer area for time slip. In this case, it is unnecessary to correct the buffer area for time slip.

Turning back to FIG. 9, the operation flow will be described.

When DVD is designated as the recording medium in the step B2, data for each VOBU is read (step B9), and presence/absence of RDI pack is checked (step B10). When the RDI pack exists, copy enable/disable information is checked (step B11).

The VOBU read in the step B9 is selected from the image data recorded on the hard disk, and specified when the user designates desired image data in the step B1.

When the copy enable/disable information of the RDI pack indicates permission for copying, the read VOBU is stored in the DVD-RAM. It is judged with respect to the recorded data of the hard disk whether or not the area of the data to be recorded (transferred) is ended (step B13). When the area is ended (yes at step B13), the processing advances to step B14. In the step B14, the management information of the VOBU to be stored is registered in the file system of DVD-RAW based on the recorded data address information. That is, the management information of the image data in the video manager (VMG) of DVD-RAM is updated. Furthermore, image data reproducing information (cell, and the like) is added after the original PGC. Additionally, the segmenting information is utilized to add the video object information such as search pointer (VOBI).

Figure 10:
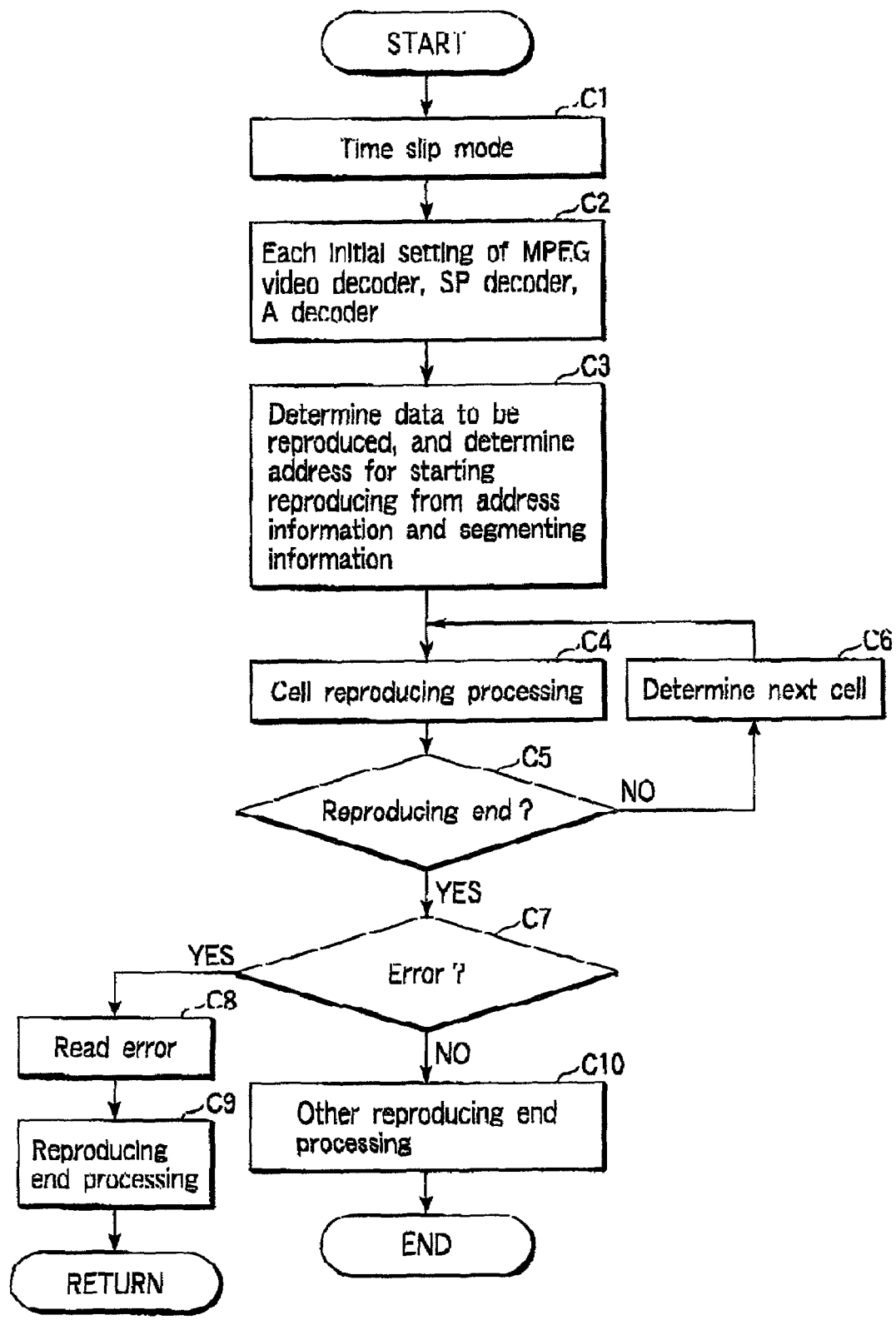
FIG. 10 is a flowchart showing a cell reproducing operation in a reproducing operation in a time slip mode of the apparatus according to an embodiment of the present invention.

FIG. 10 is a flow chart showing a reproducing operation to which the operation flow can be shifted, for example, by monitor operation or reproducing operation performed during the time slip.

First, initial setting of the decoder section 60 is performed (steps C1, C2). Subsequently, data to be reproduced in the recorded data on a hard disk side is determined, and an address for starting reproducing is determined by the address information and segmenting information (step C3).

The flow next shifts to a cell reproducing processing (step C4), and reproducing is performed. It is next checked whether or not the reproducing ends (step C5). When cell reproducing does not end, the next cell is determined (step C6), and the cell reproducing processing is continued. On the other hand, the cell reproducing ends, and it is then checked whether the reproducing is ended by an error (step C7). When the error is a read error, a reproducing end processing is performed and the flow returns to start. When there is no error, the flow shifts to other processing during reproducing end, and ends.

Figure 11:
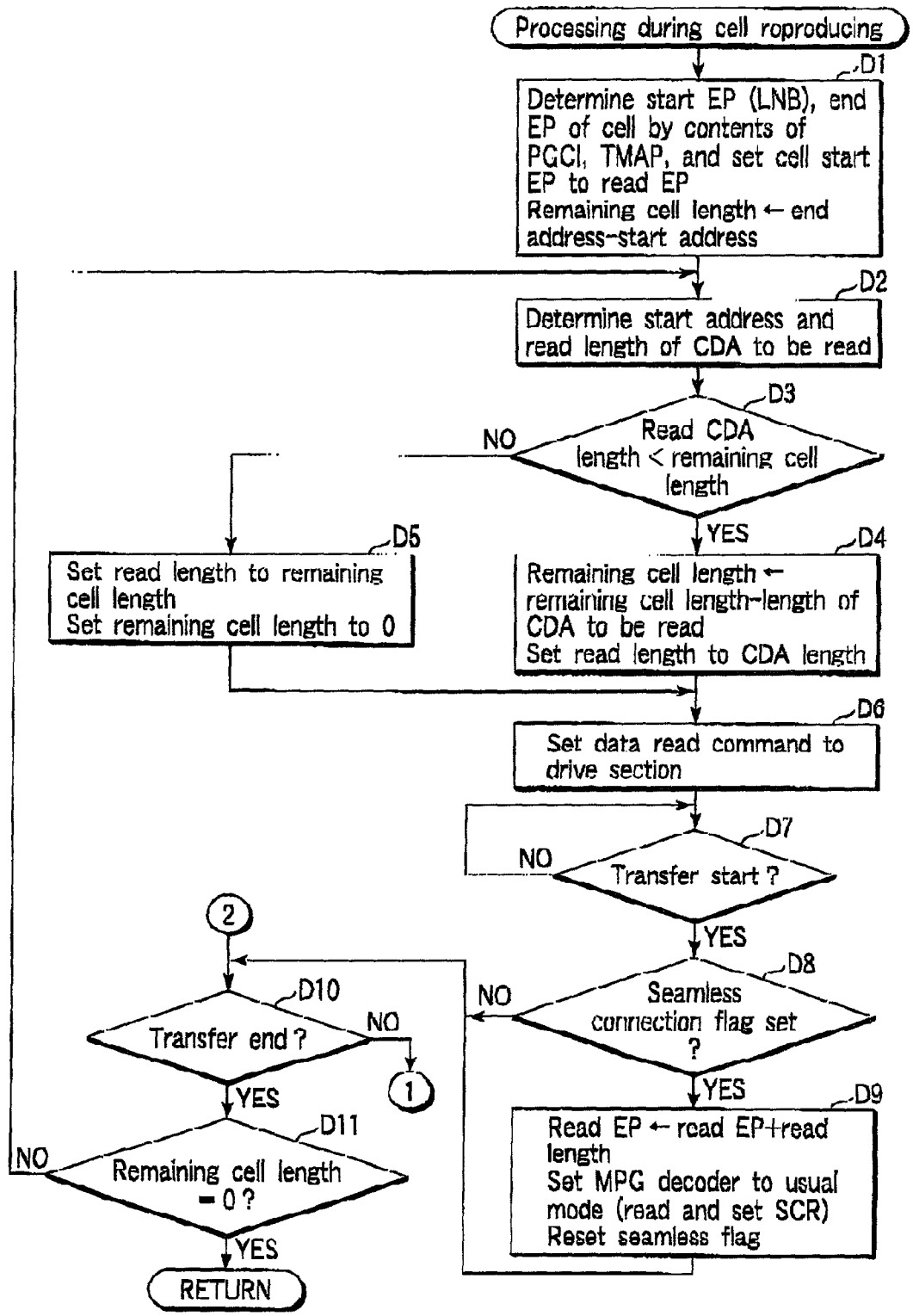
FIG. 11 is a flowchart showing an operation during reproduction of a cell of FIG. 10.
Figure 12:
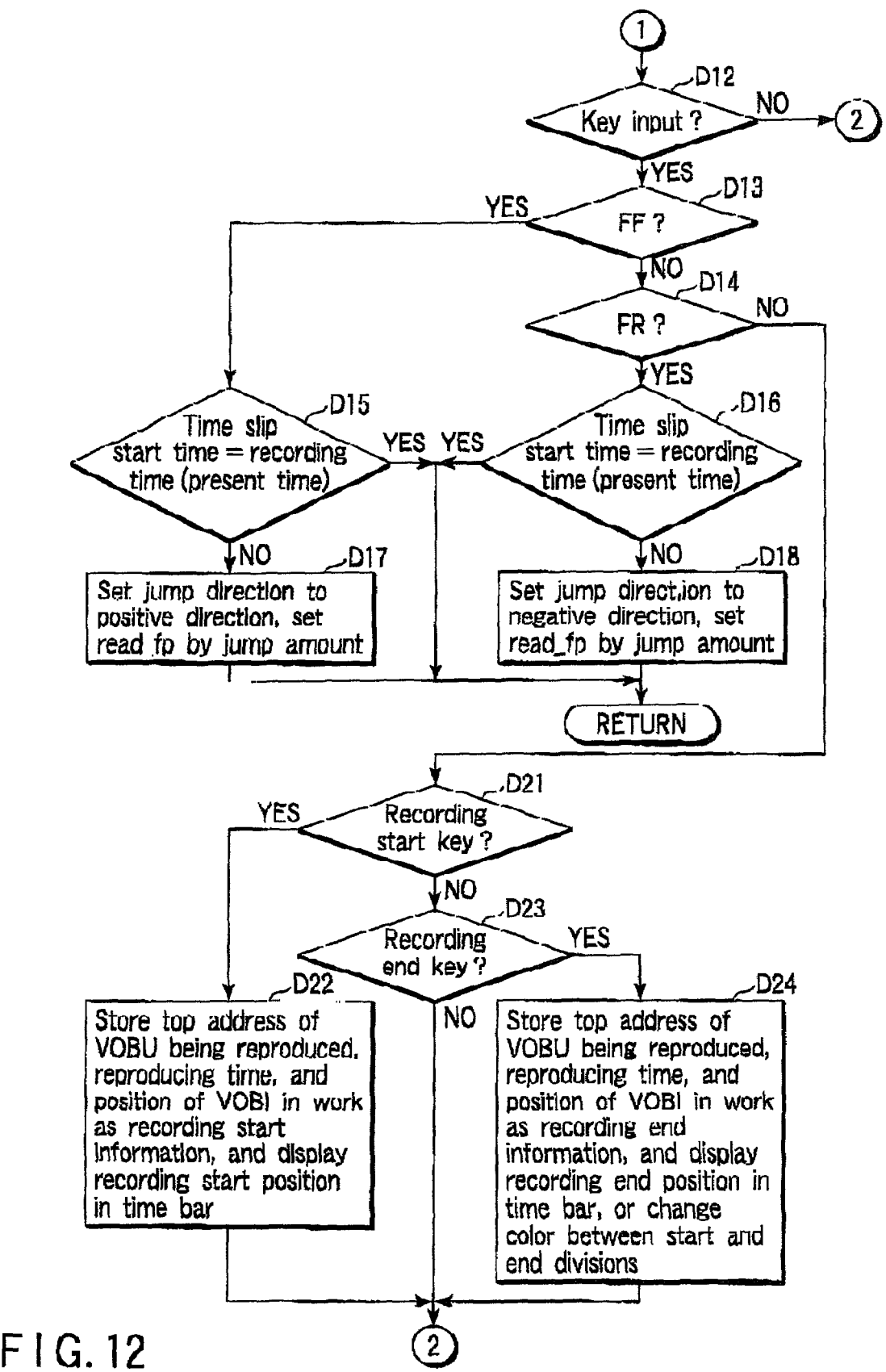
FIG. 12 is a flowchart continued from FIG. 11.

FIGS. 11, 12 show a content of the cell reproducing processing in the step C4 of FIG. 10 in detail.

A start entry point (EP(LBN)) and end entry point of the cell are determined (start EP, end EP) in accordance with contents of program chain information (PGCI) and time map information (TMAPI). The cell start entry point is set as a read entry point. A remaining cell length is obtained by subtracting a start address from an and address (step D1).

Moreover, the start address and reading length of CDA to be read are set (step D2). It is next judged whether CDA length is smaller than a remaining cell length (step D3).

Subsequently, when the CDA length is smaller, and the length of the CDA to be read is subtracted from the remaining cell length, the remaining cell length can be updated (step D4). Moreover, a reading command is set to the drive 35 based on the length of CDA to be read (step D6). When the length of the CDA to be read is larger than the remaining cell length in the step D4, the present reading length is set to the remaining cell length, and the updated remaining cell length is set to 0 (step D5).

When the reading command is set to the drive 35 (step D6), transfer is started (step D7). It is next judged whether or not a seamless connection flag is set (step D8). The seamless connection flag is included as seamless information (SMLI) in M_VOBU, and indicates whether or not the reproducing is to be performed in a seamless manner with respect to the previous VOB.

In a non-seamless state, it is judged whether or not transfer ends (step D10). However, in the seamless state, the read length is added to the read entry point, and the next read entry point is determined (step D9).

At the end of the transfer, it is judged whether or not the remaining cell length is 0. When the remaining cell length is 0, the flow shifts to the step C4 of FIG. 11. When there is a remaining cell length, the flow returns to the step D2. When the transfer does not end in the step D10, key input is judged (step D12. With the key input, it is judged whether there is a fast-forward command (step D13) or a reverse command (step D14).

With the fast-forward command, the time slip and monitor are being performed. Therefore, it is judged whether the reproducing time (time slip reproducing position) is the same as a recording time (present recording position) (step D15). Alternatively, it is judged whether there is a certain degree of difference between the times. When a condition for the fast-forward is obtained as a result of judgment, a jump direction is set to a positive direction, a reading position (reading file entry point; read_fp) is set in accordance with a jump amount, and the reproducing processing is performed by jumping to the reading position (step D17).

Moreover, with the reverse command, it is judged whether a time slip start time (time slip recording start position) is the same as the recording time (present recording position) (step D16). When a condition for the reverse is obtained as the result of judgment, the jump direction is set to a negative direction, the reading position (reading file entry point; read_fp) is set in accordance with the jump amount, and the reproducing processing is performed by jumping to the reading position (step D18). This reading file entry point is determined based on the jump amount and time map information. That is, even with a large jump amount, when desired time information described in time map information is insufficient, the jump amount is automatically limited in order to avoid an inadvertently excess jump.

The fast-forward and reverse operations performed in the reproducing during time slip (monitor mode) have been described above. The recording operation is performed as follows.

As shown in FIG. 12, a recording start key is operated (step D21), a top address of VOBU being reproduced, reproducing time, and position or VOBI in a work are stored as recording (storage) start information (step D22), and the flow shifts to the step D10. Moreover, a recording end key is operated (step D23), the top address of VOBU being reproduced, reproducing time, and position of VOBI in the work are stored as recording (storage) end information (step D24), and the flow shifts to the step D10.

Figure 13:
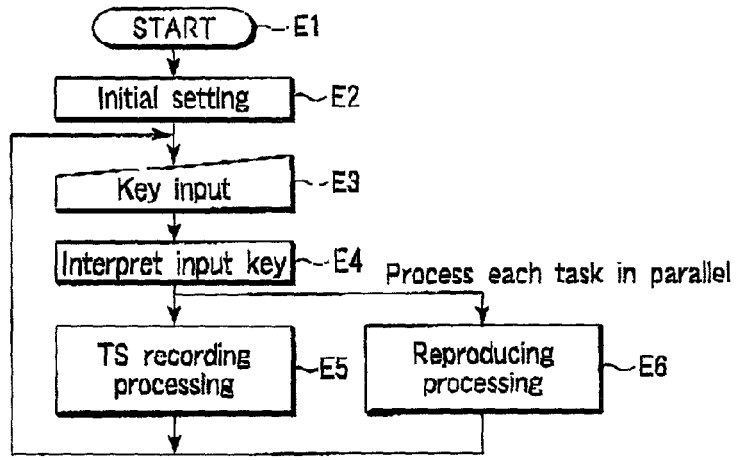
FIG. 13 is an explanatory view showing the overall functional operations of the apparatus according to an embodiment of the present invention.

FIG. 13 shows a basic operation processing flow of the present apparatus.

The apparatus is started, the encoder and decoder sections are initialized, and a command input from an operation key is waited for (steps E1, E2). When there is a key input, a content of the command of the key input is interpreted (steps E3, E4), and the flow shifts to a time slip recording processing (step E5) and/or a reproducing processing (step E6). Subsequently, the recording processing and reproducing processing are performed in a time sharing manner for each disc, and the disc is processed in parallel. The reproducing processing includes a reproducing processing in a time slip mode and a usual reproducing processing.

Figure 14:
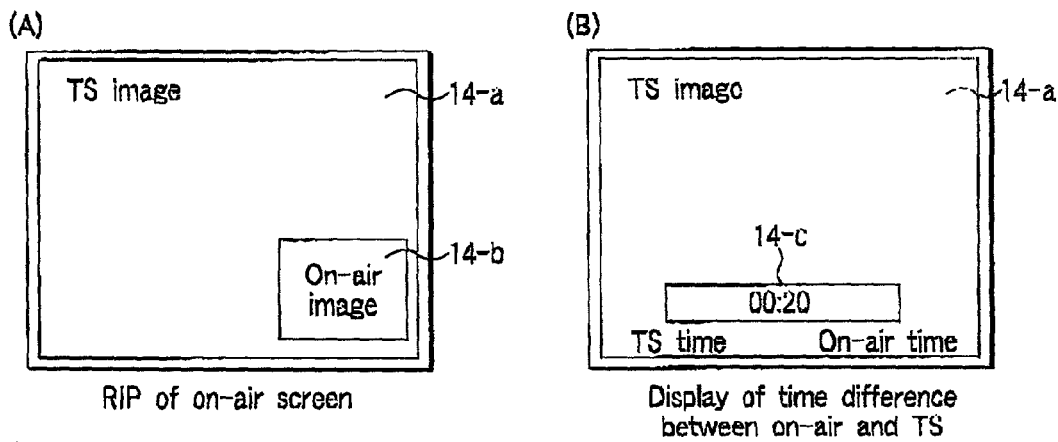
FIG. 14 is an explanatory view showing a display example on a display screen in the time slip mode of the apparatus according to an embodiment of the present invention.
Figure 14:
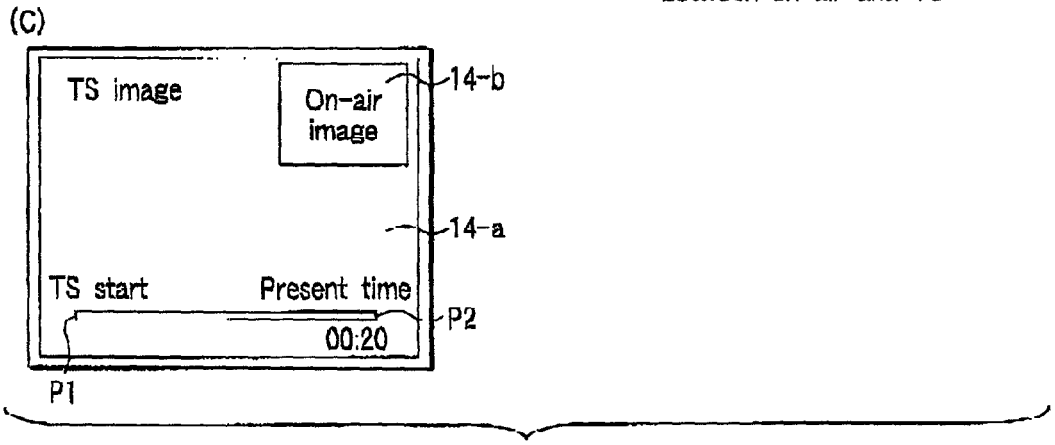

These reproducing processing contents are selected and determined in accordance with a key operation state. When the reproducing operation of the monitor mode is performed in the time slip mode, a time-slipped recorded image is reproduced. Moreover, in this case, when a sub screen display and on-air display key is selected, a screen is obtained as shown in FIG. 14A. FIG. 14A shows a situation in which a time slip image 14-a and on-air image 14-b are displayed on a monitor screen.

Furthermore, when the reproducing operation is performed in the time slip mode, the time-slipped recorded image is reproduced. Subsequently, when operation input of time difference display is performed, time difference 14-c between on-air time (present time) and time slip image is displayed. For example, the difference is numerically displayed as 20 minutes as shown in FIG. 14B. Alternatively, as shown in FIG. 14C, the time difference between an image reproduced by time slip and on-air image may be displayed by a time bar. That is, point P1 indicates an image point reproduced by the time slip, and point P2 indicates an on-air image point.

FIG. 15A shows a screen example in the monitor mode during the time slip. In this case, for example, a time bar BA is displayed. Moreover, in the monitor screen, the image data recorded on the hard disk is reproduced, and the reproducing position is displayed, for example, as a movement mark MK with a different color midway in the time bar.

In this case, when a high-speed forward or reverse operation is performed, the position of the movement mark MK can be moved to an arbitrary position on the time bar BA (FIG. 15B). A recording time of the recorded data by the time slip is displayed in minutes on the left and of the time bar BA. A shown example indicates that it takes two minutes to shift to a screen of FIG. 15B from FIG. 15A.

When a recording operation is next performed in a time slip state, an edge MK1 of the movement mark MK is fixed onto the time bar, the movement mark MK moves with time on the time bar, and a monitor recorded range RA1 is indicated as shown in FIGS. 15C and 15D. Here, when a stop operation is performed, the range RA1 does not extend as shown in FIG. 15E. Subsequently, the movement mark MK appears. This means that an image of the division shown by the range RA1 is recorded (DVD) or stored (HDD). Furthermore, in this case, the mode shifts to the monitor mode. When the reproducing of the time slip advances, the movement mark MK moves on the time bar. In this case, for the movement mark MK, when the high-speed forward or reverse operation is performed as described above, the position of the movement mark MK can be moved to the arbitrary position on the time bar BA.

Figure 16:
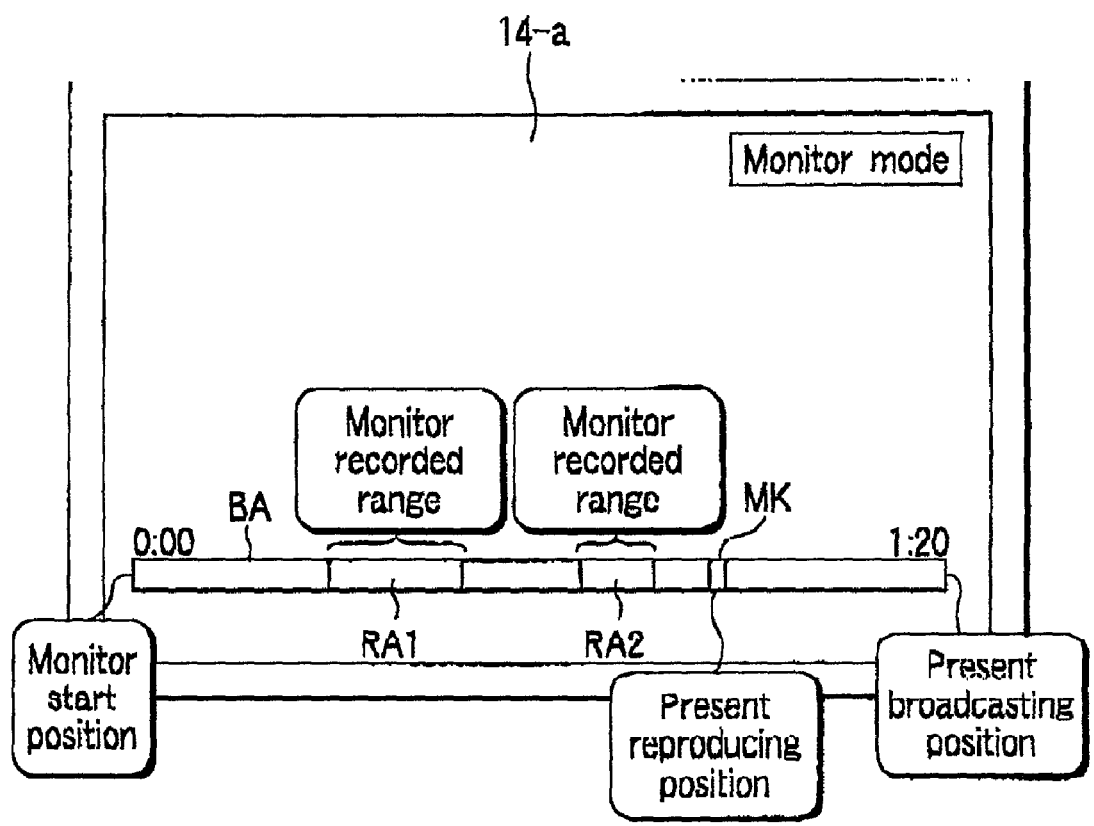
FIG. 16 is an explanatory view continued from FIG. 15.

FIG. 16 shows an example in which the movement mark MK is operated as described above, and two places (range RA1, RA2) are recorded.

Additionally, the recorded position setting is performed an a part of a key processing in the reproducing processing flow. In the processing, information of a recording start or end position is stored in a work memory. The start position is set by a gap of VOBU. With no gap, the start position is set as a top or end address of VOBU to which the image belongs.

When a setting other than the gap is permitted as the division setting (i.e., when a portion other than the gap is permitted as the reproducing starting or end position), the data is encoded again in the recording start position. For the recording end position, a processing of reproducing up to a designated frame and not reproducing subsequent frames needs to be performed. Moreover, a sequence code is attached to a last position, and the subsequent frame data (data of and after the recording end position) is deleted. The recording start (end) position information is information which indicates a recording area in the recording storage processing.

As described above, the present invention comprises a first recording/reproducing medium (hard disk) for the time slip. Moreover, a removable second recording/reproducing medium (recordable DVD, recordable/reproducible DVD, and the like) can be controlled. Moreover, there are provided means for recording information in the first recording/reproducing medium, and means for reproducing the recorded information with a time difference. Furthermore, there are provide means for recording information in the second recording/reproducing medium, and means for reproducing the recorded information. These recording/reproducing means are realized by controlling the encoder and decoder sections.

Moreover, there is provided display signal deriving means (video processor, video mixer, digital/analog processor, interface, and the like) for supplying the reproducing signal from the reproducing means to the display. Moreover, there is provided system control means (microcomputer block) for controlling the whole. Here, when the first recording means shifts to the time slip mode for performing the recording processing, the input information is encoded, and the recording processing of the first recording processing means is continued. Additionally, the position different from the recording position is reproduced by the first reproducing processing means, and the processing information can be supplied to the display signal deriving means. Moreover, in the reproducing information, the on-air image is combined and displayed as a sub screen.

Furthermore, in the time slip mode, management information of the image data being recorded and monitored are monitored. As a result, a difference between the recording position (recording time) of the recorded image and the reproducing position (reproducing time) of the reproduced signal can be grasped. When the difference is small based on the difference information, the key input of high-speed reverse is effective, but the high-speed forward is prohibited. Moreover, when the difference is sufficient, both the high-speed reverse and the high-speed forward are effective.

The hard disk is built into the apparatus in such a manner that the user cannot easily attach/detach the disc. Therefore, when the DVD system is combined as in the present invention, not only simple recording/reproducing but also various utilization vales can be fulfilled. When the information temporarily recorded on the hard disk is transferred and stored in the DVD, a storage capacity of the hard disk can infinitely be utilized.

Additionally, the present invention is not limited to the aforementioned embodiment, and the format of DVD-RAM is employed in the encode system of the encoder section 30. However, this is not limited, and a desired program packet may be extracted from a digital broadcast signal and recorded as it is by a processing circuit. In this case, as the reproducing processing, decoding of the packet is performed once by a given decoder.

Moreover, various operations in the aforementioned apparatus are realized by operating a cursor operation lever, mode selection key, jog dial, and various other keys in a remote control apparatus.

As described above, according to one embodiment of the present invention, DVD-RAM and another recordable medium are used together with the hard disk built in the apparatus. In this constitution, the function of the hard disk can effectively be utilized.

Moreover, when the format recorded on the hard disk is set to be the same as formats of other recording media (DVD-RAM, and the like), the data read from the hard disk can easily be transferred and decoded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording/reproducing apparatus comprising:
   a first recording/reproducing medium;
   a first recording/reproducing processing section configured to record information on or reproduce information from said first recording/reproducing medium;
   a second recording/reproducing processing section configured to record information on or reproduce information from a second recording/reproducing medium;
   a display signal output section configured to supply an external device with a reproduction signal from at least one of said first and second recording/reproducing processing sections;
   a system control section configured to control an operation of the apparatus; and
   a section configured to compose input information, being subjected to recording processing of said first recording/reproducing processing section, with a reproduction signal, being reproduced by said first recording/reproducing processing section, to provide a result of composition, and configured to output the composition result to said display signal output section;
   wherein, if a time slip mode is activated in response to a given time slip instruction signal, said system control section enables a fast forward operation when a time difference between a recording time at which the input information is recorded and a reproducing time of recorded information corresponding to the input information is equal to or less than a predetermined value, and
   wherein the fast forward operation or a fast reverse operation is enabled when the time difference is larger than the predetermined value.

2. A recording/reproducing apparatus according to claim 1, wherein said first recording/reproducing medium is formed of a temporary storage medium which is installed in the apparatus.

3. A recording/reproducing apparatus according to claim 1, wherein a data recording format of said first recording/reproducing medium has a same structure as a data recording format of said second recording/reproducing medium.

4. A recording/reproducing apparatus according to claim 1, wherein, if a time slip mode is activated in response to a given time slip instruction signal, said system control section enables a normal reproduction operation when a recording time at which recording of the input information starts matches a reproducing time of recorded information corresponding to the input information.

5. A recording/reproducing apparatus according to claim 1, wherein
   said input information includes image information,
   when a time slip instruction signal is given, said system control section supplies said display signal output section with the input information and reproduction information reproduced by said first recording/reproducing processing section, and
   either of the input information and the reproduction information is displayed on a child screen.

6. A recording/reproducing apparatus according to claim 1, wherein
   said input information includes image information, and
   when a time slip instruction signal is given, said system control section calculates a time difference between a recording screen of the input information and a reproducing screen which may be used for monitoring, generates a time bar or display text data corresponding to the calculated time difference, and supplies the generated time bar or display text data to said display signal output section.

7. A recording/reproducing apparatus according to claim 1, wherein
   said input information includes image information,
   when a time slip instruction signal is given, said system control section controls said first or second recording/reproducing processing section such that if recording instruction information is given, image data being currently reproduced is recorded on said first or second recording/reproducing medium, and
   when time slip end information is given, management information required to reproduce the recorded data is created, and the created management information is recorded on the corresponding recording/reproducing medium.

8. A recording/reproducing apparatus according to claim 1, wherein said management information includes original program chain information as a part of video manager information.

9. A recording/reproducing apparatus according to claim 1, wherein
   said input information includes image information, and
   when at least said second recording/reproducing processing section encodes data output from said first recording/reproducing processing section, and if the encoded data is to be recorded on said second recording/reproducing medium, said system control section
   discriminates copy control information contained in a predetermined unit of the encoded data,
   records the encoded data in the predetermined unit only if a copy is allowed, and
   stops recording processing of said second recording/reproducing processing section if the copy is inhibited.

10. A recording/reproducing apparatus comprising:
    a first recording/reproducing medium;
    a first recording/reproducing processing section configured to record information on or reproduce information from said first recording/reproducing medium;
    a second recording/reproducing processing section configured to record information on or reproduce information from a second recording/reproducing medium;
    a display signal output section configured to supply an external device with a reproduction signal from at least one of said first and second recording/reproducing processing sections;
    a system control section configured to control an operation of the apparatus; and
    a section configured to compose input information, being subjected to recording processing of said first recording/reproducing processing section, with a reproduction signal, being reproduced by said first recording/reproducing processing section, to provide a result of composition, and configured to output the composition result to said display signal output section;
    wherein said input information includes image information, wherein, when at least said second recording/reproducing processing section encodes data output from said first recording/reproducing processing section, and if the encoded data is to be recorded on said second recording/reproducing medium, said system control section discriminates copy control information contained in a predetermined unit of the encoded data, records the encoded data in the predetermined unit only if a copy is allowed, and stops recording processing of said second recording/reproducing processing section if the copy is inhibited, and wherein, if a time slip mode is activated in response to a given time slip instruction signal, said system control section enables a fast forward operation when a time difference between a recording time at which the input information is recorded and a reproducing time of recorded information corresponding to the input information is equal to or less than a predetermined value, and fast forward operation or a fast reverse operation is enabled when the difference is larger than the predetermined value.

11. A recording/reproducing apparatus according to claim 10, wherein said predetermined unit is a unit including:
a control pack containing control data, said control pack being located at a head of the unit, and
one or more video packs subsequent to the control pack.

12. A recording/reproducing apparatus according to claim 10, wherein
said input information includes image information, and
when a time slip instruction signal is given, and if recording instruction information and recording time information are input, said system control section
stops an output from said display signal output section,
controls said first or second recording/reproducing processing section such that data of a currently reproduced image is recorded as a data file on said first or second recording/reproducing medium, and
creates, when recording is completed, management information required to reproduce the data recorded as the data file, wherein the created management information is recorded on the corresponding recording/reproducing medium.

13. A recording/reproducing apparatus according to claim 12, wherein said data file is added to video object data, and said management information includes a new program chain information to be added to an already existing original program chain information.

14. A recording/reproducing apparatus according to claim 10, assuming that a time slip instruction signal is given, that recording time information as well as recording specifying information for specifying data to be stored from the recorded data are input, and that said first recording/reproducing medium is selected for storing the specified data, wherein
said system control section excludes a portion of management for the specified data from management information recorded in a buffer area provided for a purpose of time slipping in said first recording/reproducing medium, and
a lack of the buffer area caused by the above exclusion is compensated for by other area of said first recording/reproducing medium.

15. A recording/reproducing apparatus according to claim 10, wherein a data format of recording on said first recording/reproducing medium is selected to be equal to that of recording on said second recording/reproducing medium, and
when data being recorded on said first recording/reproducing medium is recorded on said second recording/reproducing medium, this recording is performed without a format conversion.

16. A recording/reproducing method which can be used in an apparatus comprising a first recording/reproducing medium, a first recording/reproducing processing section for recording information on or reproducing information from the first recording/reproducing medium, a second recording/reproducing processing section for recording information on or reproducing information from a second recording/reproducing medium, a display signal output section for supplying an external device with a reproduction signal from at least one of the first and second recording/reproducing processing sections, a system control section for controlling an operation of the apparatus, said method comprising:
composing input information, being subjected to recording processing of said first recording/reproducing processing section, with a reproduction signal, being reproduced by said first recording/reproducing processing section, to provide a result of composition, and outputting the composition result to said display signal output section, wherein said input information includes image information; and
when at least said second recording/reproducing processing section encodes data output from said first recording/reproducing processing section, and if the encoded data is to be recorded on said second recording/reproducing medium,
discriminating copy control information contained in a predetermined unit of the encoded data;
recording the encoded data in the predetermined unit only if a copy is allowed; and
stopping recording processing of said second recording/reproducing processing section if the copy is inhibited; wherein, if a time slip mode is activated in response to a given time slip instruction signal, enabling a fast forward operation when a time difference between a recording time at which the input information is recorded and a reproducing time of recorded information corresponding to the input information is equal or less than a predetermined value.

17. A recording/reproducing method according to claim 16, wherein, if a time slip mode is activated in response to a given time slip instruction signal, enabling a normal reproduction operation when a recording time at which recording of the input information starts matches a reproducing time of recorded information corresponding to the input information.

* * * * *